April 23, 1957 W. SHOCKLEY 2,790,037

SEMICONDUCTOR SIGNAL TRANSLATING DEVICES

Filed March 14, 1952 11 Sheets-Sheet 1

INVENTOR
W. SHOCKLEY
BY [signature]
ATTORNEY

INVENTOR
W. SHOCKLEY
BY
ATTORNEY

SEMICONDUCTOR SIGNAL TRANSLATING DEVICES

Filed March 14, 1952 11 Sheets-Sheet 3

INVENTOR
W. SHOCKLEY
BY [signature]
ATTORNEY

INVENTOR
W. SHOCKLEY
BY [signature]
ATTORNEY

SEMICONDUCTOR SIGNAL TRANSLATING DEVICES

Filed March 14, 1952 11 Sheets-Sheet 5

INVENTOR
W. SHOCKLEY
BY [signature]
ATTORNEY

April 23, 1957 W. SHOCKLEY 2,790,037

SEMICONDUCTOR SIGNAL TRANSLATING DEVICES

Filed March 14, 1952 11 Sheets-Sheet 6

INVENTOR
W. SHOCKLEY

BY [signature]

ATTORNEY

April 23, 1957 W. SHOCKLEY 2,790,037

SEMICONDUCTOR SIGNAL TRANSLATING DEVICES

Filed March 14, 1952 11 Sheets-Sheet 7

INVENTOR
W. SHOCKLEY
BY [signature]
ATTORNEY

INVENTOR
W. SHOCKLEY
BY
ATTORNEY

INVENTOR
W. SHOCKLEY
BY [signature]
ATTORNEY

SEMICONDUCTOR SIGNAL TRANSLATING DEVICES
Filed March 14, 1952
FIG. 20
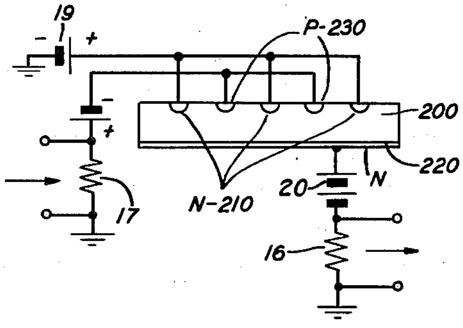
FIG. 22
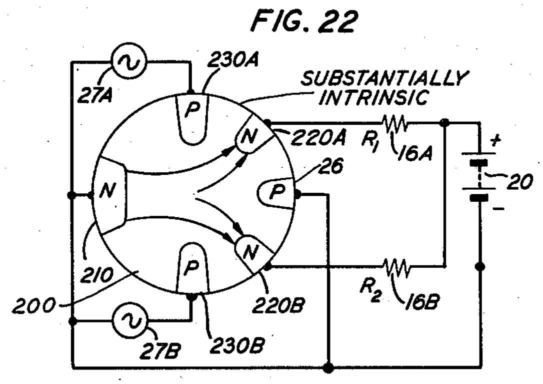
FIG. 21A
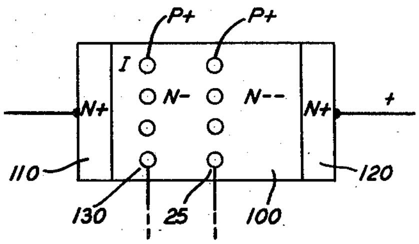
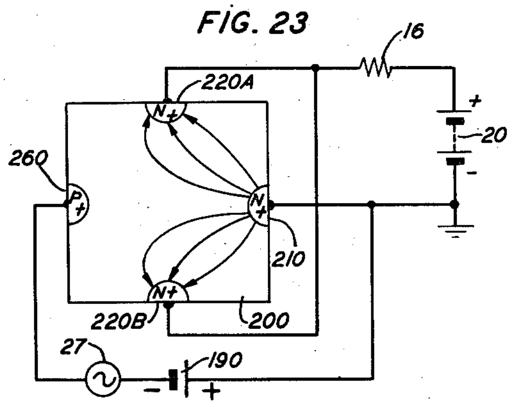
FIG. 21B
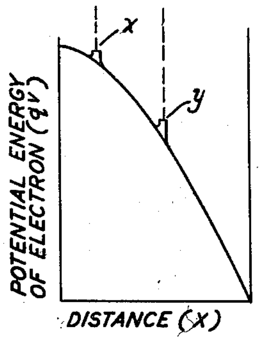
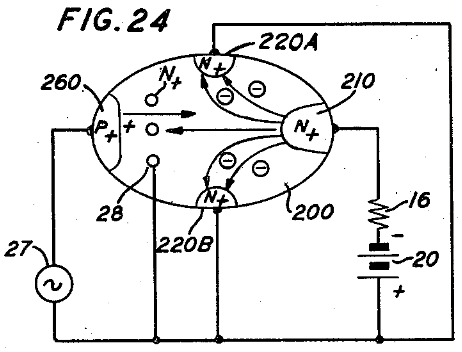
INVENTOR
W. SHOCKLEY
BY
ATTORNEY

SEMICONDUCTOR SIGNAL TRANSLATING DEVICES

Filed March 14, 1952

11 Sheets-Sheet 11

INVENTOR
W. SHOCKLEY
BY
ATTORNEY

United States Patent Office 2,790,037

Patented Apr. 23, 1957

2,790,037

SEMICONDUCTOR SIGNAL TRANSLATING DEVICES

William Shockley, Madison, N. J., assignor to Bell Telephone Laboratories, Incorporated, New York, N. Y., a corporation of New York Application March 14, 1952, Serial No. 276,511

7 Claims. (Cl. 179—171)

This invention relates to signal translating devices utilizing semiconductive bodies and more particularly to such devices including three or more connections to the semiconductive body and capable of generating, amplifying, modulating, and otherwise translating electrical signals.

Electrical signal generation and translation is effected to a major extent at the present time through the agency of electron discharge devices and, more specifically, vacuum tubes. Such devices, despite their manifest utility and widespread utilization, have definite limitations and practical disadvantages. Among these are fragility, limited useful life, and necessity for filament or heater power supplies. Additionally, and these factors are of particular moment from performance standpoints, electron discharge devices suffer from limitations in the current densities that can be realized practically from the emitter or cathode and in the potentials which can be employed on the control electrode or grid without the latter drawing a substantial amount of current. Further, in electron discharge devices, an inherent and ever present problem arises by virtue of space charge. Operation of such devices entails control or neutralization of space charge, but the mechanisms available are restricted for practical purposes. For example, electron space charge may be neutralized through the use of a gas and attendant space charge of ions. However, ionic space charge introduces deleterious effects such as noise, time delay, and variability.

Some of the disadvantages and limitations of electron discharge devices have been overcome by the advent of semiconductor devices.

Before discussing such devices, it may be advantageous to review some of the salient characteristics of semiconductive materials and the principles and phenomena involved in electrical conduction thereby. For this purpose, germanium may be taken as an illustrative material, although it will be understood that the same considerations apply to others, such as other elemental semiconductors, for example silicon, and semiconductive compounds, for example lead sulfide, lead telluride, and copper oxide, and that in its broader aspects, the invention is not limited to any particular semiconductive material.

Semiconductors of the type generally employed at present in signal translating devices are of the class known as extrinsic, that is, the basic material contains small amounts of significant impurities which result in an excess in the material of either of two types of electrical carriers. The impurities may be present in the material as cast or may be added during fabrication of the material. Such semiconductors and particularly those wherein the impurities are added are referred to commonly as doped. If the dominant significant impurity, or impurities, is of the class known as donors, the free carriers normally in excess are electrons, and the material is denoted as N conductively type; if the dominant significant impurity, or impurities, is of the class known as acceptors, the free carriers normally in excess are holes, and the material is denoted as of P conductivity type. Conduction by extrinsic material is due primarily to the presence and flow of the carriers introduced by impurities. A detailed exposition of the mechanisms involved in germanium and like elemental semiconductors is found in chapter 1 of Electrons and Holes in Semiconductors, by W. Shockley, published 1950 by D. Van Nostrand Company, Incorporated.

Extrinsic germanium such as is now employed in translating devices has a resistivity, at room temperature, in the range from a few ohm centimeters to a few tens of ohm centimeters, and the excess carrier densities at this temperature are of the order of $10^{15}$ per cm.$^3$. Ideal intrinsic germanium would have a resistivity at room temperature of about 60 ohm centimeters and essentially equal numbers of holes and electrons.

Semiconductor, e. g., germanium, devices capable of generating, amplifying, modulating, and otherwise usefully translating electrical signals now are known in the art. Illustrative of such devices, which are generally referred to as transistors, are those disclosed in Patent 2,524,035, granted October 3, 1950, to J. Bardeen and W. H. Brattain and in Patent 2,569,347, granted September 25, 1951, to W. Shockley. These devices involve, in general, injection of carriers into a body, or zone of a body, of extrinsic germanium or like material, the injected carriers being of the sign opposite that of those normally present in excess in the body or zone. The carrier injection is controlled in accordance with signals to be translated, whereby, inter alia, the conductivity of the body or zone is modulated correspondingly and amplified replicas of the signals are obtained in a load circuit associated with the device. A limitation upon the performance of such devices, specifically the upper frequency of the operating range, results from the finite transit times of the carriers involved in the conduction process. Also, in general, and particularly in point contact devices, unless special constructional features are introduced, the current gain realizable is relatively small. Further, although transistors may be compared with electron discharge devices in function and performance characteristics, as is known and as discussed in some detail in Duality as a Guide in Transistor Circuit Design, by R. L. Wallace and G. Raisbeck, Bell System Technical Journal, April 1951, page 381, and in W. Shockley, loc. cit., pages 92–95, the two are not strictly analogs. Thus, in some applications, substantial alteration in configuration and design of known electron discharge device circuitry is necessary to utilize transistors for like purposes.

Improved performance from the standpoint of frequency range of operation of semiconductor translator devices of presently known types can be achieved through operation of the device so that a space charge region is established in the semiconductive body, as disclosed, for example, in the application Serial No. 243,541, filed August 24, 1951, of W. Shockley, now Patent 2,744,970, issued May 8, 1956. Establishment of such space charge region, however, entails the use of fairly high voltages and, further, the region is of limited extent. Improved performance from the standpoint of current gain may be realized, as disclosed in the application Serial No. 237,746, filed July 20, 1951, of W. W. van Roosbroeck, by utilizing a body of highly purified material wherein the excess carrier concentrations are small or one wherein electron-hole pairs are generated in such profusion that effectively the two kinds of carriers are in substantial equality. The conductivity of the body and hence the current flow between two metallic connections thereto is controlled by injecting carriers of one or the other sign, as by way of a point contact bearing against the body. Such devices, in general, require relatively high current densities for satisfactory operation and operate upon the principle of conductivity modulation of regions in which the space charge is substantially zero. Also, current gain increase is realized at the expense of frequency range of operation.

One general object of this invention is to provide a unique class of signal translating device free from disadvantages and limitations of presently known devices of both the electron discharge and semiconductor types.

Another general object of this invention is to attain novel and improved performance characteristics for semiconductor signal translating devices.

More specific objects of this invention are to extend the operating frequency range of semiconductor translators, to enhance the gain obtainable with such devices, to enable operation at any prescribed current and current density in a wide range, to realize operation at very high current densities, to improve the control of signals generated or translated, to achieve flexibility in the manner or mode of operation, to enlarge the fields of application of semiconductor signal translating devices, and to simplify the design of circuits for utilization of such devices.

In one illustrative embodiment of this invention, a translating device comprises a body of semiconductive material having therein a substantially intrinsic region. This region is of very high purity, whereby the donor-acceptor unbalance is such that the resistivity of the region does not deviate more than about five percent from intrinsic. As will be pointed out hereinafter, this region is such that the unbalance of donor and acceptor densities is less than $5.5\times10^{10}\kappa/x$, where $x$ represents dimensions of the region in centimeters, and $\kappa$ is the dielectric constant. The field density due to impurities is less than $10^5$ volts per centimeter.

The body has therein also, contiguous with the region, at least three zones of extrinsic material, two of the zones being of like conductivity type and the third of the opposite conductivity type, the several zones being relatively biased each at the polarity opposite that of the excess carriers therein, whereby any carriers generated in the bulk material are attracted to one or more of the zone or zones of opposite polarity.

Thus, the thermally generated carriers in the semiconductor are swept out of the substantially intrinsic region. Under these conditions, the bulk portion of the semiconductor has a lower conductivity than ideally pure or intrinsic material would have at the same temperature.

The two zones of like conductivity are biased relative to each other so that excess carriers of the sign characteristic of these zones pass from one zone into the swept or substantially intrinsic region and flow to the other of these zones. For ease of discussion, the first zone will be referred to herein as the source and the second as the drain. The third zone, that is, the one of opposite conductivity type, is utilized to control this flow of carriers between the two like zones.

The control may be effected in accordance with several principles or modes. Emission of carriers from the source is dependent upon the field adjacent the source, and this field is amenable to control in accordance with the potential of the third or control zone. Also, because of the swept intrinsic character of the bulk material, the emission of carriers will set up a space charge in the bulk which may be modified by varying the potential of the drain or the control zone thereby to control the flow of carriers from the source to the drain.

Two major principles of devices constructed in accordance with this invention are to be noted especially, to wit, the substantial denuding of the bulk material of carriers generated therein, as by thermal effects, and the control of flow of carriers from the source and into the bulk material by either a field effect or space charge control, or both.

It may be noted that devices constructed in accordance with this invention may involve changes of carrier density; however, in some embodiments, these changes take place for carriers of one sign only, the densities of the other carriers being negligible. In these embodiments, changes in space charge occur and produce substantial changes in electric fields. These resulting fields contribute beneficially to a reduction of transit time.

The several zones may be arrayed in several ways. For example, the source and drain may be disposed on opposite faces or at opposite corners of the semiconductive body and the control zone be positioned laterally adjacent the path from source to drain, closely adjacent the source, as in the same face of the body as the source, or between the source and drain. Additional zones may be provided as described hereinafter.

Material suitable for use in devices constructed in accordance with this invention may be produced by successive purification of extrinsic semiconductors. For example, extrinsic material may be molten and cast, as in the manner disclosed in the application Serial No. 638,351, filed December 29, 1945, of J. H. Scaff and H. C. Theuerer, now United States Patent 2,602,211 issued July 8, 1952 whereby a segregation of impurities along an axis of the resulting ingot is produced. The purer portion of the ingot is then again melted, whereby a further segregation of impurities is effected. This is repeated until the final ingot or a desired portion thereof exhibits a donor-acceptor unbalance of the desired magnitude. This unbalance may be determined in the manners indicated in Shockley, Electrons and Holes in Semiconductors, section 1.3, and G. L. Pearson and J. Bardeen, Physical Review 75, 865. Advantageously, single crystal material is employed. Such material may be produced in the manner described in the application Serial No. 234,408, filed June 29, 1951, of E. Buehler and G. K. Teal.

The several zones may be produced in the high resistivity body by placing in contact therewith a donor or acceptor, or an alloy or mixture of the body material and a donor or acceptor, and melting the applied member thereby to develop in the resulting body an N or P zone, the N zone resulting, of course, when the applied material is a donor or donor bearing and a P zone being produced when the applied material is an acceptor or acceptor bearing. Indium is a typical acceptor and antimony a typical donor for germanium. Illustrative methods for producing a zone of N or P material are disclosed in the application Serial No. 136,038, filed December 30, 1949, of W. G. Pfann and H. C. Theuerer, now Patent 2,701,326, issued February 1, 1955 and Serial No. 271,712, filed February 15, 1952, of M. Sparks, now Patent 2,695,852, issued November 30, 1954.

The invention and the several features thereof will be understood more clearly and fully from the following detailed description with reference to the accompanying drawing, in which.

Figure 13:
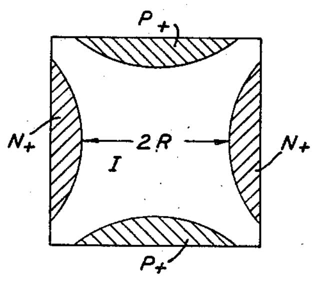
Figure 14:
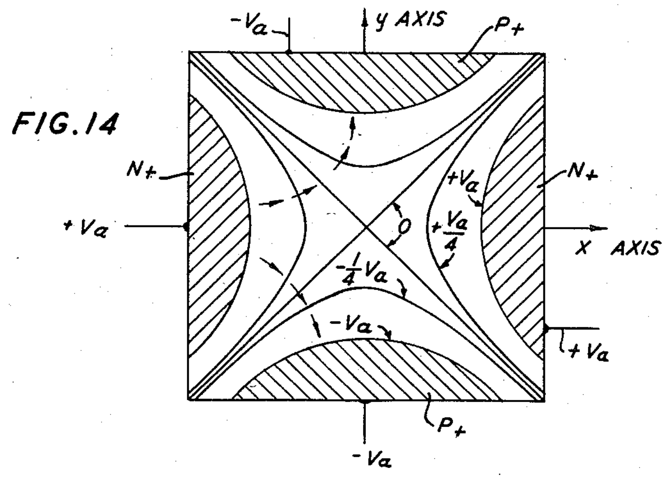
Figure 15:
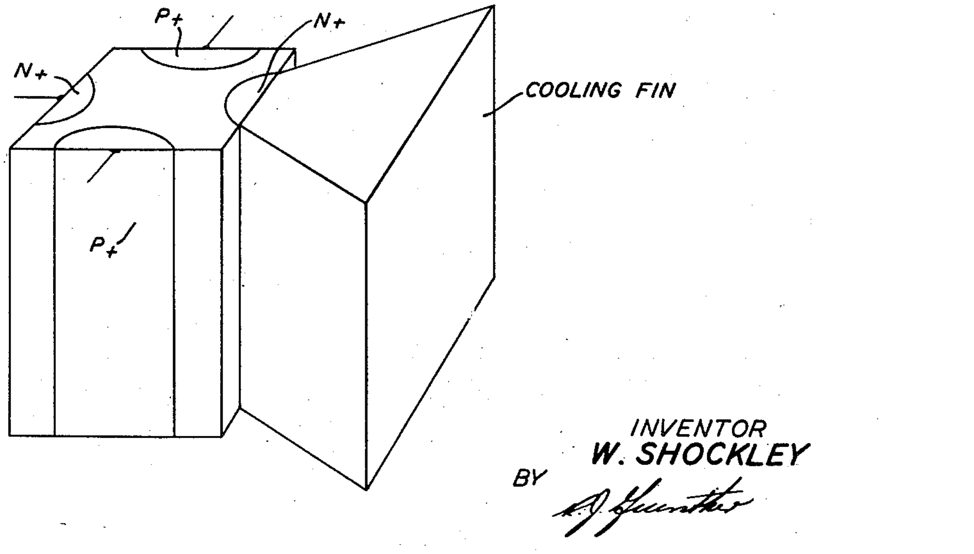
Figure 16:
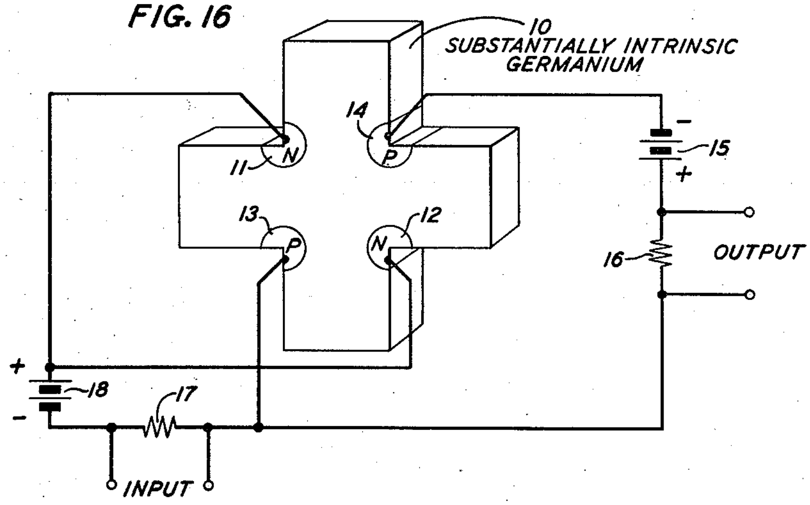
Figure 17A:
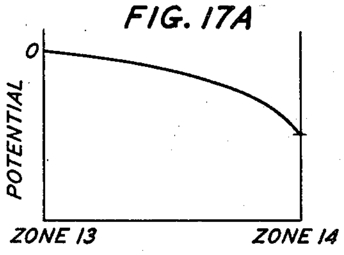
Figure 17B:
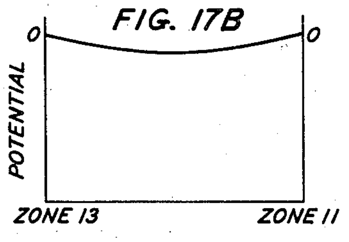
Figure 17C:
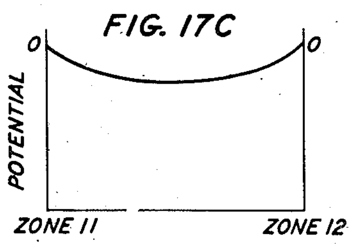
Figure 18:
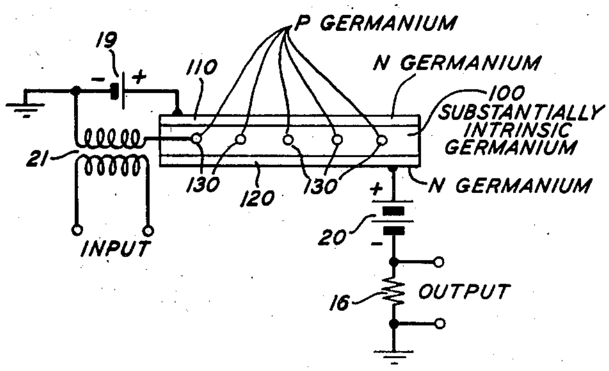
Figure 19A:
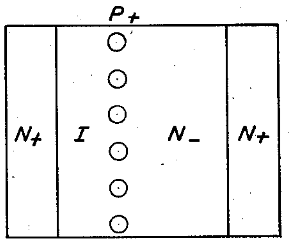
Figure 19B:
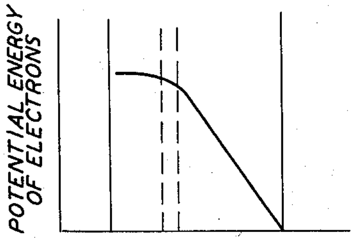
Figure 19C:
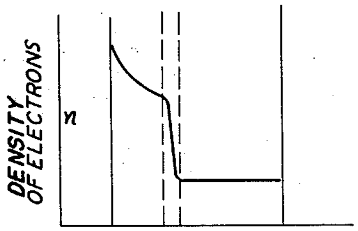
Figure 19D:
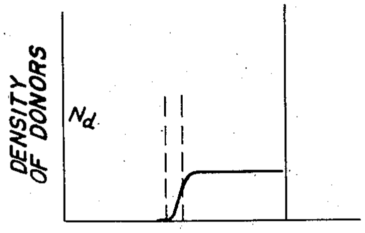
Figure 25:
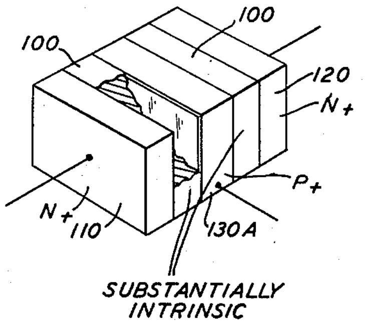
Figure 26:
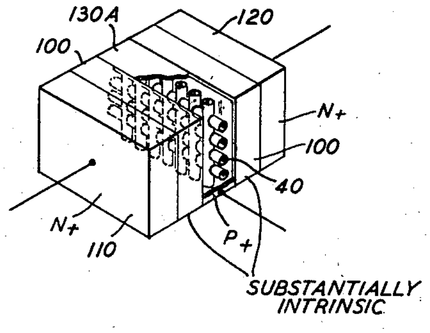
Figures 27, 28:
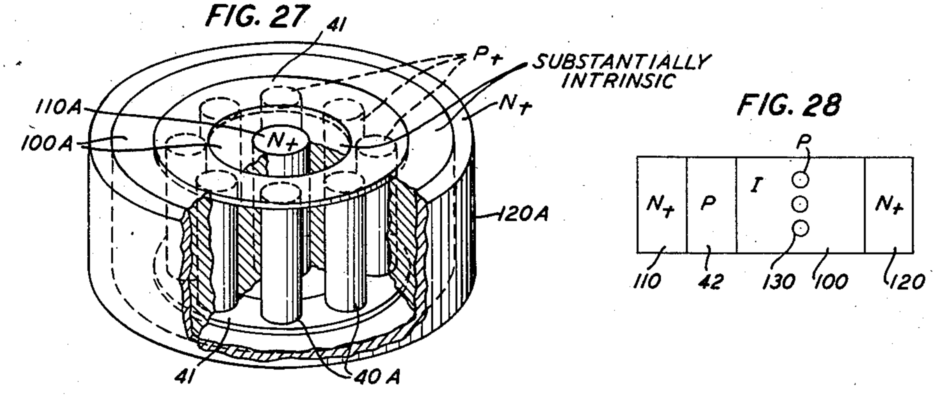
Figure 29:
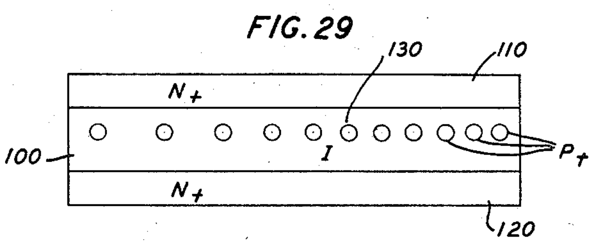
Figure 30:
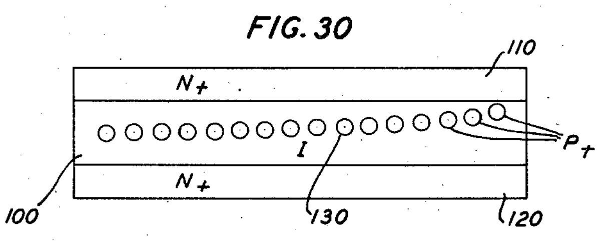

Figs. 3 to 12B, inclusive, are diagrams and graphs showing certain parametral relationships which will be referred to hereinafter in the exposition of performance and design considerations for devices constructed in accordance with this invention;

Fig. 13 is a plan view of a semiconductive element illustrative of those which may be uilized in certain embodiments of this invention;

Fig. 14 is a plot portraying the potential distribution in the semiconductor illustrated in Fig. 13;

Fig. 15 is a perspective view of one device including a body of the type and configuration represented in Fig. 13;

Fig. 16 is in part a perspective view of a semiconductive body and in part a circuit diagram portraying a translating device illustrative of one embodiment of this invention;

Figs. 17A, 17B, and 17C are graphs depicting potential distributions in the semiconductor of Fig. 16 for certain conditions of bias of the extrinsic zones;

Fig. 18 illustrates a triode amplifier constructed in accordance with this invention and including a control electrode between the source and drain regions;

Fig. 19A represents a modification of a triode depicted in Fig. 18 and each of Figs. 19B, 19C, and 19D is a graph of a characteristic of such modification;

Fig. 20 portrays another triode illustrative of an embodiment of this invention wherein the source and control zones are arrayed in alternate relation in one face portion of a substantially intrinsic semiconductive body;

Fig. 21A shows a tetrode constructed in accordance with this invention and including an auxiliary electrode or grid between the control electrode and the drain;

Fig. 21B is a graph illustrating the potential distribution in the semiconductive body of the device shown in Fig. 21A;

Fig. 22 portrays another illustrative embodiment of this invention particularly suitable for push-pull operation;

Fig. 23 illustrates another translating device constructed in accordance with this invention and particularly suitable for the realization of current gains;

Fig. 24 shows a modification of the device illustrated in Fig. 23;

Fig. 25 is a perspective view of a translating device embodying this invention, wherein the control or auxiliary zone encompasses the substantially intrinsic region;

Fig. 26 depicts a modification of the embodiment illustrated in Fig. 25 wherein the control zone includes a grid or mesh portion;

Fig. 27 portrays another embodiment of this invention wherein the emitter, collector, and control zones are cylindrical and coaxially arrayed;

Fig. 28 illustrates another embodiment of this invention particularly suitable for operation at relatively low emitter current densities; and Figs. 29 and 30 show still other embodiments of this invention constituting analogs of remote cut-off or volume control types of electron discharge devices.

It may be noted that in the drawing, zones of the semiconductive bodies illustrated are designated by the letter N, P, or I, indicative of the conductivity type thereof. Strongly N-type material, say of the order of 0.01 ohm centimeter resistivity germanium, is designated N+, and weak N material, say of the order of 40 ohm centimeter resistivity germanium, is designated N–. Similarly, strong and weak P-type material, say of the order of 0.01 ohm centimeter and 40 ohm centimeter resistivity germanium, is designated P+ and P–, respectively.

Full understanding of the invention, appreciation of the several features thereof, and construction of devices in accordance therewith will be facilitated by a detailed analysis of the basic principles and relationships of parameters involved. Such analysis is presented in the eleven numbered sections immediately following. For convenience of reference, a table of the symbols employed in this analysis is presented here.

$b$=ratio of electron to hole mobility
$C$=capacitance per unit area or simply capacitance
$D$=diffusion constant for thermal motion of holes or electrons
$e$=2.73=base of naperian logarithms
$E$=electric field
$f$=frequency
$J$=current density
$k$=Boltzmanns constant
$L_r$=see Section VI
$m$=mass of free electron
$n$=density of electrons in conduction band
$n_i$=$n$ in intrinsic material
$N_d$, $N_a$=density of donors, acceptors, respectively
$p$=density of holes in valence band
$q$=absolute value of electronic charge
$Q_r$=see Section VI
$R$=resistance
$t$=time
$T$=absolute temperature
$v$=velocity of hole or electron
$V$=voltage or electrostatic potential
$x$=position along one axis
$y$=position along another axis
$\alpha$=defined in Section VIII
$\epsilon_0$=MKS permitivity of free space
$L$=permitivity of free space in farads/cm., see Section II
$\eta$=defined in Section VI
$\kappa$=dielectric constant
$\mu$=drift mobility
$\rho$=resistivity, also charge density
$\rho_r$=see Section VI
$\sigma$=conductivity
$\tau$=a life time or diffusion time
$\tau_r$=see Section VI

I. *Some basic principles for analog-structure design*

It may be helpful in understanding the principles of devices embodying this invention to compare the structures and principles with those of vacuum tubes. In many vacuum tubes, the electrodes can be classified into four groups—electron emitting, electron receiving, electron controlling, and secondary emitting surfaces. The cathode of a vacuum tube is generally heated, and its surface is covered by a space charge layer composed of thermionically emitted electrons. Under conditions of space charge limited emission, this space charge layer causes a maximum to occur in the potential energy versus distance curve for an electron. The current flowing over this maximum may be calculated by statistical mechanical methods and is well approximated by Child's law (see, for example, K. T. Compton and I. Langmuir, Reviews of Modern Physics, 3, 237 (1931)). The distribution of potential in the volume beyond the space charge layer is determined by the boundary values and by the space charge produced by the electrons themselves. Except for cases involving secondary emission, no other sources of current or space charge are present in the tube. If some gas is present, a space charge of ions may arise. This space charge tends to cancel that of the electrons and permits much larger currents to flow in such devices as thyratrons and spark gap tubes. However, an ionic space charge has adverse effects in most amplifying devices due to noise produced by ionic motion and due to time lags associated with changes in ionic distributions.

The analog of the space of the ideal vacuum tube is pure intrinsic germanium, silicon, or other semiconductor. If the semiconductor is not pure and has an unbalance of donor and acceptor densities, there will be a residual charge density in this space. We shall give below criteria for estimating whether the impurities will have major or minor influence upon the behavior of the device. We shall refer to this material as the "space body."

The analog of a thermionically emitting cathode is a body of highly doped N-type material in intimate contact with the space body. We shall refer to such a body as a "source body" or simply "source." We shall initially deal with electron sources, turning later to hole sources. A preferred embodiment is one in which the space body and electron source body are portions of the same single crystal of germanium and differ only in the densities of donors and acceptors they contain. An advantage of the source body over a thermionic cathode is that it is capable of far greater current densities per se and requires no heat.

The analog for a negative grid or control electrode is a body of highly doped P-type material. In the neighborhood of a negative grid wire, the electric field is in such a direction as to tend to extract electrons from the grid. In the case of the analog, this field will be such as to suppress the emission of holes. Since the body is highly doped P-type, the current of electrons from it will be very small, as is well known from the theory of saturation currents from P-N junctions. (See, for example, Shockley, Electrons and Holes in Semiconductors, page 316; the saturation electron current in Equation 31 is seen to decrease with increasing conductivity $\sigma_p$ of the P-region.) A preferred form of such a "grid body" is again a portion of the same single crystal as the space body with proper impurity content.

It should be noted that an advantage of the analog-structure is that the grid need not be negative in respect to the source in order to reduce electron current to the grid substantially to zero, whereas in a vacuum tube it must be negative. The reason for this difference is that in a vacuum tube, the electrons conserve their energy and so may reach the grid if it is positive in respect to the cathode. In the analog-structure, energy is lost in the conduction process and, unless the structures are comparable in size to a mean-free path, which is about $10^{-5}$ cm., there is no conservation of momentum of the electrons. Hence, in such structure biasing the grid so that the field at its surface is electron repelling over a region large enough to produce a drop of a few tenths of a volt will suffice to prevent electron flow to the grid.

The analog for a plate or anode is an N-type region like the source but biased so as to attract electrons. Under these conditions, it will emit a small current of holes which decreases as its impurity density increases.

The analog of space charge due to ions is the space charge of donors and acceptors in the space body. In germanium at room temperature, the fraction of the donors and acceptors that are neutralized by electrons or holes for carrier densities of $10^{15}$/cm.$^3$ is less than one in a thousand. (See Shockley loc. cit. page 247, Fig. 10–7, and page 24.) Consequently, the space charge of the donors and acceptors remains substantially unaltered even though the carrier density varies over wide limits. As a result, the ion space charge may be considered as stationary and constant as the device operates. For amplifying devices and high frequency devices, this is highly advantageous compared to gas discharge tubes in which the ions change in number and location.

In silicon, on the other hand, a significant fraction of the electrons in an N-type sample may be bound to donors at room temperature. (See Shockley loc. cit. page 15 and Fig. 1–9 and also Fig. 1–12.) Changes in the number of electrons bound to donors result in changes in the ionic space charge and may be used to simulate effects of changing ion densities in gas discharge tubes. It should be pointed out that this effect can be enhanced by using large concentrations of donors and acceptors in approximate compensation. Under these conditions, the density of electrons required to neutralize an N-type sample will be $N_d-N_a$; if $N_d$ is made larger while keeping $N_d-N_a$ constant, it is evident that the fraction of electrons bound to donors will be increased. This means can be used to achieve space bodies in which the space charge can be made to increase by large proportions by "ionization" of neutral donor electron centers. This ionization can be provoked by "hot electrons," i. e., electrons whose average energy of motion has been increased by the application of high electric fields. (See Shockley, Hot Electrons in Germanium and Ohm's Law, Bell System Technical Journal, 30, 990 (1951).)

In the analogs discussed above, emphasis has been placed upon electrons as the active carriers. It is evident that similar analogs can be discussed in which holes are active simply by interchanging the roles of donors and acceptors and reversing the signs of voltages and currents.

II. *The analog of Child's law*

We shall next consider some quantitative relationships that may be used for designing structures embodying various features of this invention. The first of these is the analog for Child's law. Child's law is derived by assuming that the field and potential at the cathode are zero, the current density is J, the space charge is $\rho$, and the velocity of motion is $$v=\sqrt{2qV/m} \quad (2.1)$$

where V is the voltage through which the electrons have fallen. The current density is $$J=\rho v \quad (2.2)$$

This leads to Poisson's equation in MKS units in the form $$\epsilon_0(d^2V/dx^2)=\rho=J(m/2eV)^{1/2} \quad (2.3)$$

This equation, which we have written without regard to sign, can be integrated to give $$J=(4/9)\epsilon_0(2e/m)^{1/2}V^{3/2}x^2$$
$$=2.33\times10^{-6}V^{3/2}x^2 \text{ amp./m.}^2 \quad (2.4)$$

where $x$ is the distance from cathode to anode plane.

For the analog equation, we shall suppose that we are dealing with electrons so that their charge density has a negative sign, and the potential $V(x)$ increases from $x=0$ where the field is zero to positive values for $x>0$. The drift velocity is to the right and is given by $$v=\mu dV/dx \quad (2.5)$$

In writing this expression, we tacitly ignore the effects of diffusion. This is the analog of neglecting the thermal velocity distribution in Child's law. We return to this point below. The charge density is then $$\rho=J/v \quad (2.6)$$

where J is the absolute value of current density, the current being in the direction of decreasing $x$. Poisson's equation with due regard to sign is $$\kappa\epsilon_0 d^2V/dx^2=-\rho=J/v=J\div\mu\frac{dV}{dx} \quad (2.7)$$

This equation is readily integrated to give V in terms of $x$ $$V=(2/3)(2J\kappa\epsilon_0\mu)^{1/2}x^{3/2} \quad (2.8)$$

and a current of $$J=(9/8)\kappa\epsilon_0\mu V^2/x^3 \quad (2.9)$$

In a parallel plane diode with total voltage V and width W, the transit time is $$\int_0^W dx/v=\int_0^W dx/\mu)dV/dx)$$
$$=(2\kappa\epsilon_0 W/\mu J)^{1/2} \quad (2.10a)$$

In this form, the transit time is expressed as a function of J and W. Using (2.9) to eliminate J leads to $$\text{Transit time}=4W^2/3\mu V \quad (2.10b)$$

which shows that the transit time is 1/3 greater than for a uniform field $V/W$ over a distance W. If W is eliminated from (2.10$a$), we obtain $$\text{Transit time}=(\kappa\epsilon_0/J)^{2/3}(3V/\mu)^{1/3} \quad (2.10c)$$

The magnitude of the electric field at $x=W$ is $$dV/dx=3V/2W$$
$$=(3JV/\kappa\epsilon_0\mu)^{1/3} \quad (2.11)$$

We shall present numerical values for (2.10) and (2.11) in Section VI.

For germanium, we have $$\kappa=16 \quad (2.12)$$
$$\mu=0.36\text{m.}^2/\text{volts sec.} \quad (2.13)$$

so that $$J = 5.75 \times 10^{-11} V^2/x^3 \text{ amp./m.}^2 \quad (2.14)$$

It is instructive to compare this with Child's law, which is $$J_L = 2.33 \times 10^{-6} V^{3/2}/x^2 \text{ amp./m.}^2 \quad (2.15)$$

The comparison is best made in terms of the formulae in MKS units and gives $$\frac{J \text{ (Child)}}{J \text{ (Analog)}} = \frac{32}{81K}\left[\frac{2eV}{m}\right]^{1/2} \frac{1}{(\mu V/x)} \quad (2.16)$$

In this form, the ratio is seen to be about one fortieth times the ratio of the velocity of an electron in free space with kinetic energy $eV$ and the velocity of an electron drifting in germanium under a field $V/x$. Drift velocities of $10^6$ to $10^7$ cm./sec. have been observed in germanium (see Shockley, Hot Electrons in Germanium and Ohm's Law, Bell System Technical Journal, 30, 990 (1951)). For these high velocities, dependence of mobility upon electric field modifies the above analysis somewhat. In estimating the ratio of currents, however, we may take $v = 10^6$ cm./sec. as an example. For equality of the currents, the Child's law velocity must be $4 \times 10^7$ cm./sec., which corresponds to a voltage of about 0.4 volt. From this we see that for geometrically similar structures, the Child's law current will exceed the analog current for applied voltages greater than about 0.4 volt. At 40 volts, the ratio would be 10.

This relationship is not particularly significant, however, because Child's law devices are more generally limited by the limited emission from the cathode. This limitation is much less severe in the analog-structures, as we shall see by considering the conditions governing the space charge distribution, the numerical values being discussed subsequent to Equation 5.10.

Before embarking on the analysis leading to this result, we shall change to a system of units more convenient for our purposes than the MKS units. This system of units, referred to as the "L system" in Shockley loc. cit. page 213, uses the volt, coulomb, and ampere for electrical quantities and the centimeter for length. In this system, the permitivity of free space is denoted by $$\epsilon_L = 8.85 \times 10^{-14} \text{ farads/cm.} \quad (2.17)$$

In these units, Poisson's equation is formally the same as in the MKS and is $$\kappa \epsilon_L d^2V/dx^2 = \rho \quad (2.18)$$

where $\rho$ is the charge density in coulombs/cm.$^3$. The current density is $$J = \rho \mu E \quad (2.19)$$

with all quantities expressed in the L system. In the L system, all the equations for semiconductors have the same form as those derived above and take on the correct values if $\epsilon_0$ is replaced by $\epsilon_L$. The current for the Child's law analog becomes $$J = 5.75 \times 10^{-9}\ V^2/x^3 \text{ amp./cm.}^2 \quad (2.20)$$

The same procedure cannot be carried out for Child's law, since mechanical units and electrical units of energy are not consistent in the L system. However, Child's law may be directly transformed from Equation 2.14 and becomes $$J = 2.33 \times 10^{-6}\ V^{3/2} x^2 \text{ amp./cm.}^2 \quad (2.21)$$

the numerical coefficient being the same in the two systems.

III. *Space charge region around source*

Figure 1:
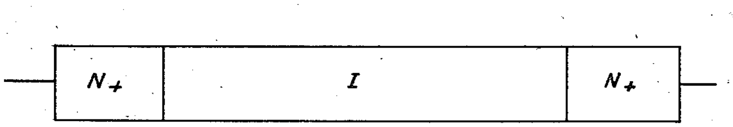
Fig. 1 is a diagram of a semiconductive body including extrinsic and substantially intrinsic zones associated as in devices constructed in accordance with this invention.
Figure 2A:
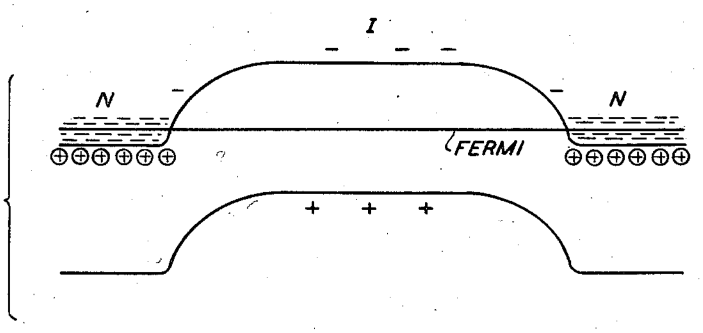
Figs. 2A and 2B are energy level diagrams for a semiconductive device including a body of the configuration illustrated in Fig. 1.

Fig. 1 represents an "N+IN+ structure" consisting of two highly doped N-regions on opposite faces of a plane parallel region of intrinsic material. In Fig. 2A, the line so designated represents the Fermi level and is drawn as though the electron concentrations in the N+-regions were greater than $10^{19}$ cm.$^{-3}$ so that the electron gases therein were degenerate. The I-region is supposed to be wide enough so that the central region is substantially unaffected by the ends. The criterion for this is that it should be many "Debye Lengths" wide where the Debye length is that defined by Equation 2.12 in Shockley, The Theory of p-n Junctions in Semiconductors, Bell System Technical Journal, 28, 441 (1949). In an intrinsic sample of germanium at thermal equilibrium at room temperature, the Debye length is about $6 \times 10^{-5}$ cm. Where the potential begins to vary from a constant value in the middle of region "I" of Fig. 2A, the deviation increases by a factor of $e$ for each Debye length. When the deviation in potential exceeds $kT/q = (1/40)$ volt, the rate of increase is even faster. Thus, the deviation from a small fraction of $(kT/q)$ up to the maximum value shown in this figure for the intrinsic material will occur in less than $10^{-3}$ cm.

In the N+-region, the effective Debye length is less by a factor $(2n_i/n_n)^{1/2}$, as may be seen from the text following Equation 2.13 of the reference, letting $n_i$ = the density of electrons in the intrinsic material and $n_n$ that in the N-region. The physical reason for the factor of 2 is that the total density of mobile carriers is $2n_i$ in intrinsic material and is substantially $n_n$ in doped material. Since this ratio of $n_i$ to $n_n$ may be about $10^{-6}$ in our example, it is evident that the potential disturbance will extend only about $10^{-3}$ times as far into the N-region as it does into the intrinsic region.

Let us next suppose a potential is applied so that electron flow to the right is produced. The potential distribution will then assume the form shown in Fig. 2B, the imref or quasi-Fermi level for electrons (defined in Shockley, Sparks, and Teal in the Physical Review 83, 151 (1951) and Shockley, Electrons and Holes in Semiconductors, page 308) being shown. Although it is possible to determine the potential distribution, electron and hole densities and currents from the system of non-linear differential equations appropriate to this figure, the physical insight necessary to apply the features of this invention may be more readily grasped by a simpler procedure. For this purpose, we consider Fig. 3.

Figure 2B:
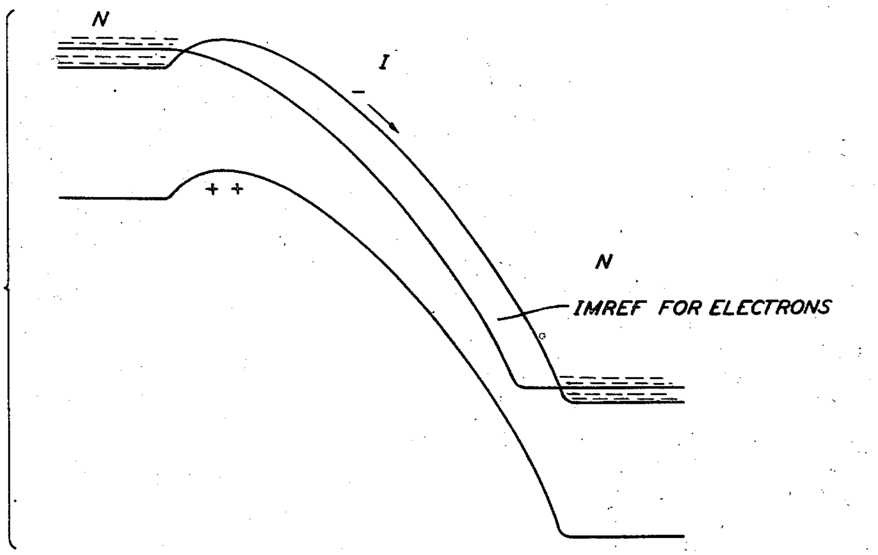

This figure represents a potential energy distribution similar to Fig. 2B. However, we do not specify what distribution of charges produces this potential distribution V($x$). We shall next assume that V($x$) is a known function of $x$ and shall calculate the electron density. The equation for current density J from right to left is:

$$J = q\mu n dV/dx - qDdn/dx \quad (3.1)$$

(Equation 3.1 is discussed in Shockley, Electrons and Holes in Semiconductors, page 299, Equation 1$b$; the signs are different since, by definition, $I_n$ is current to right and J is current to left and $E = -dV/dx$.) The solution of this equation is readily found by standard methods (see, for example, Madelung, Die Mathematischen Hifsmittel des Physiker, Dover Publications, New York city, New York, 1943, page 171, entry $b$ of the Table of Solutions; or H. T. H. Piaggio, An Elementary Treatise on Differential Equations and Their Applications, G. Bell and Sons, Ltd., London 1929, page 17; or other standard texts) and may be expressed formally as $$qn(x) = (J/D)(\exp[qV(x)/kT]) \int_x^{\infty} \exp[-qV(y)/kT]dy + \text{const} (\exp[qV(x)/kT]) \quad (3.2)$$

where "const" may be chosen arbitrarily and we shall consider the upper limit $\infty$ below.

In order to interpret "const" we approximate the solution at some point $x_1$, well to the right of $x=0$, where we may write by Taylor's theorem $$V(x) = V(x_1) - (x - x_1)E_1 + \ldots \quad (3.3)$$

and may suppose the omitted terms are relatively small over a range in which $V(x)$ increases by many times $kT/q$. Inserting this in the integral leads to $$qn(x_1)=(J/D)\ (-kT/qE_1)+\text{const}\ \exp(qV(x_1)/kT)$$
$$=J/(-E_1)\mu+\text{const}\ \exp(qV(x_1)/kT) \quad (3.4)$$

In this expression, the product $-E_1\mu$ is simply the drift velocity towards increasing $x$. The first term, therefore, represents simply the charge density necessary to carry the current J by drift. The term with "const" carries no current and represents a distribution of electrons in thermal equilibrium. Such a distribution should not be present in appreciable concentration until the abrupt potential drop ceases, as, for example, at the right edge of Fig. 2B. From this reasoning, we conclude that "const" must be very small, so that it becomes comparable to $J/(-E_1)\mu$. In fact, if we assume that at the right edge of Fig. 2B, the "const" term accounts for the entire density $n_n$, then at 0.5 volt above the N-region on the right, the density is less by a factor of $3\times10^8$ and at one volt it is less by $10^{17}$. From this, it is evident that the "const" term is negligible throughout the major part of the middle region.

The same reasoning indicates that the exact choice of the upper limit in the integral term is unimportant. A convenient choice may be taken as some point in the N-region on the right. An exact choice can be made which will lead to a proper allowance for the ohmic drop due to electron current in this region. Since the steps are somewhat tedious and add little to the physical picture, however, we shall not burden the exposition with them.

Accordingly, we shall take our solution as $$qn(x)=(J/D)\{\exp[qV(x)/kT]\}I(x) \quad (3.5)$$

where the symbol $I(x)$ is defined by the equation $$I(x)=\int_x^\infty \exp[-qV(y)/kT]dy \quad (3.6)$$

From the consideration of certain general features of $I(x)$, important semiquantitative conclusions can be reached about the relationships between $n(x)$, J, and a quantity L defined below.

Figure 3:
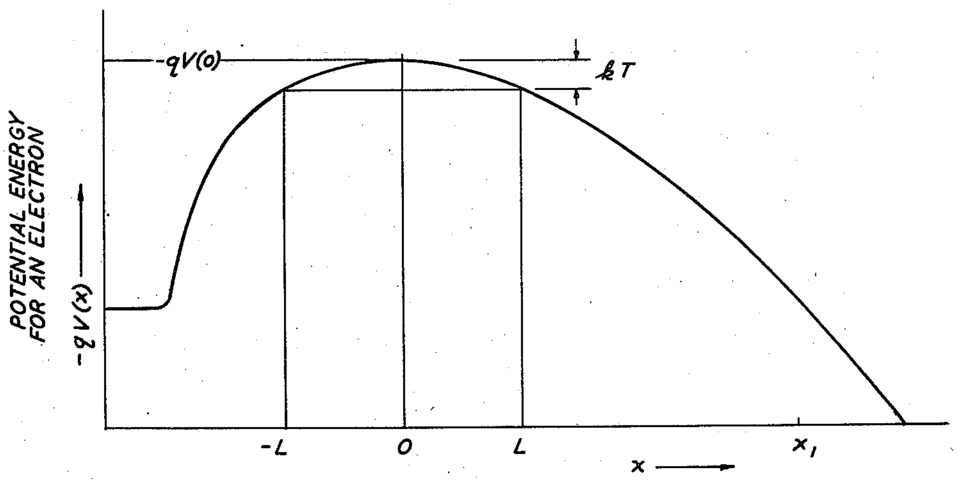
Figure 4:
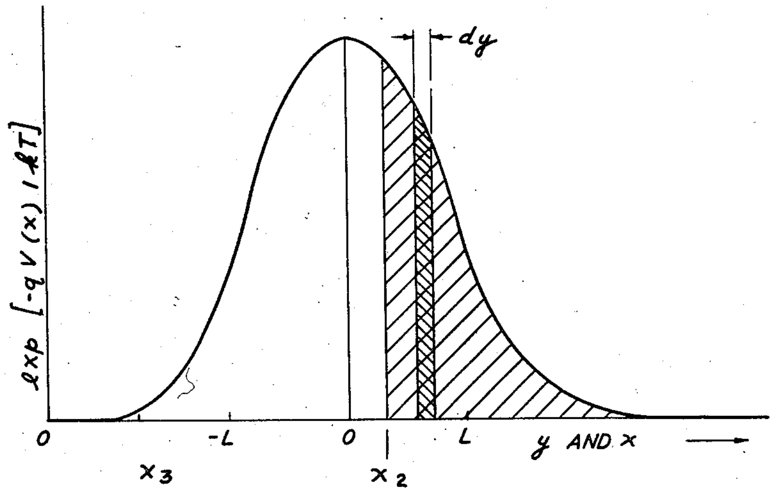
Figure 5:
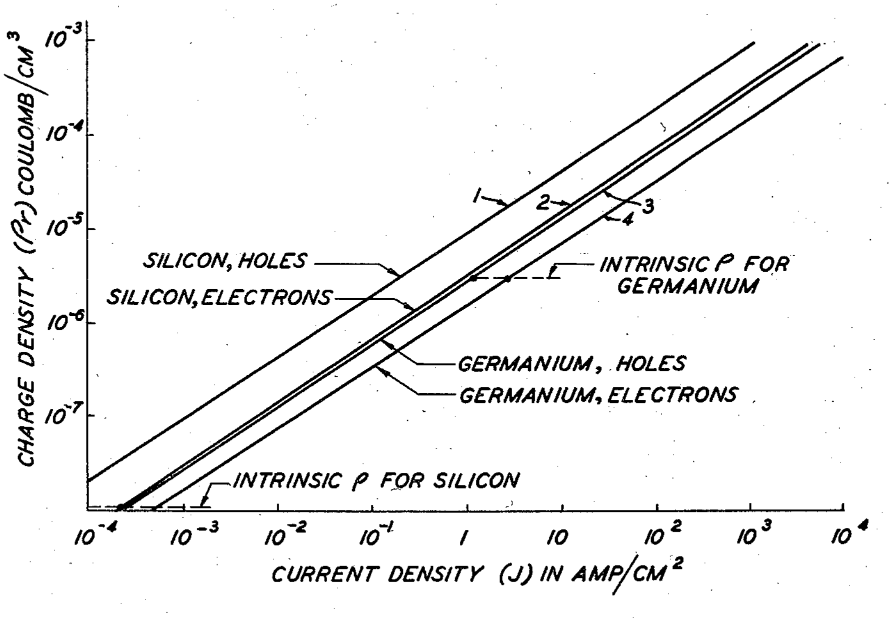
Figure 6:
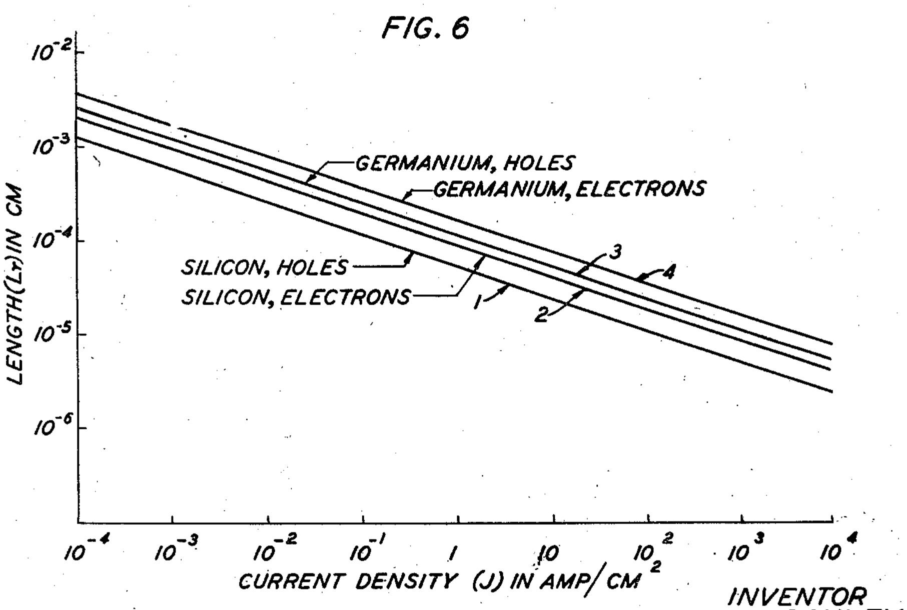
Figure 7:
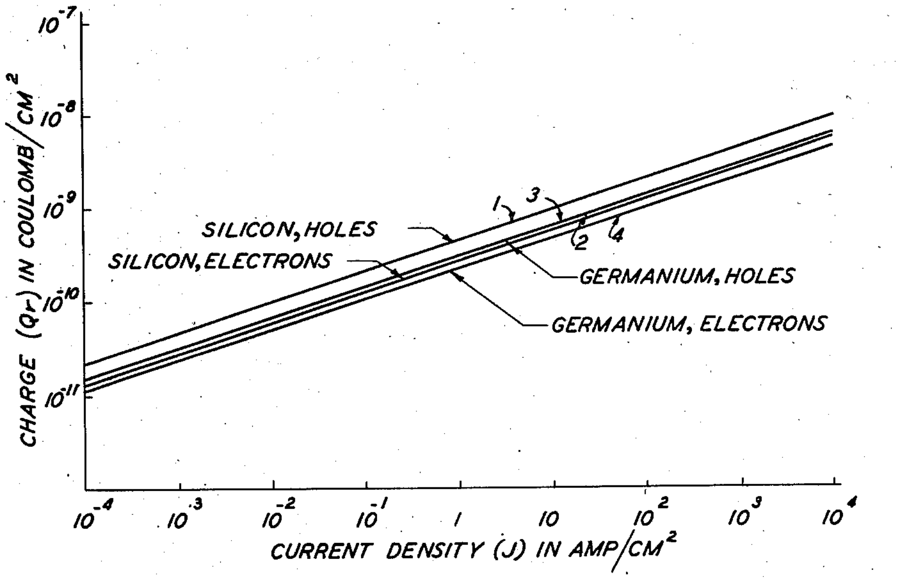
Figure 8:
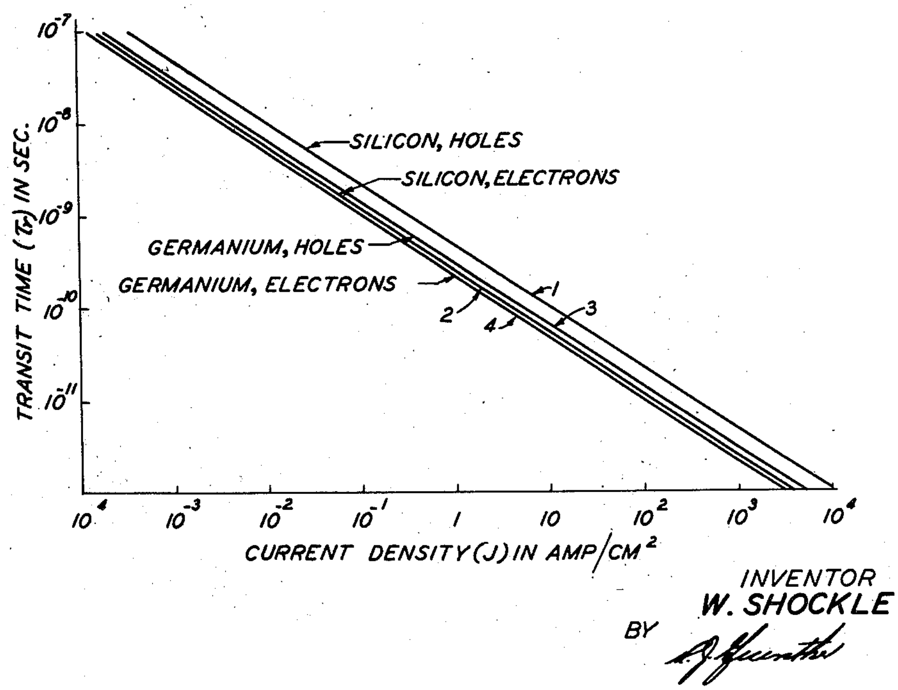

The integrand in $I(x)$ is evidently a bell shaped function of $y$ as represented in Fig. 4 with its maximum at $x=0$ where the maximum in the potential energy of Fig. 3 occurs. The value of the integral when $x=x_2$ may be represented by the shaded area of Fig. 4 with one of the elementary contributions indicated by $dy$. From inspection of the figure, we see that the principal contribution to the integral comes from a region 2L wide where L is the distance at which the potential energy decreases by $k$T from its maximum. For $x<x_3$, therefore, the integral is nearly constant at its maximum value. For $x$ greater than L, it decreases rapidly leading to the approximation previously used that $$\int_x^\infty \exp[-qV(y)/kT]dy \doteq -kT/qE(x) \quad (3.7)$$

corresponding to current flow entirely by drift.

Let us next consider the region to the left of $x=-L$. In this region, the integral $I(x)$ has nearly its limiting value denoted by $I_m$. In this region, therefore, $$qn(x)\doteq(I_mJ/D)\exp(qV(x)/kT) \quad (3.8)$$

To the degree that $I_m$ is a good approximation to I, this represents the "Boltzmann" or thermal equilibrium distribution of electrons. Since $I_m$ is a good approximation to $I(x)$ for $x<-L$, it is evident that withdrawal of electrons to form the current J does not disturb the distribution of electrons markedly beyond a potential energy drop of $k$T below the maximum. An electron at $k$T below the maximum has only about one chance in $e$ of getting over the maximum as compared to drifting down hill. As a result, the electron distribution at $x=-L$ is not disturbed much by electron loss.

At $x=0$, the value of $I(x)=I(0)$ is about (½) $I_m$. Hence, the electron density is one half what it would be from the Boltzmann distribution. For the Boltzmann or equilibrium distribution, the Quasi Fermi level or imref (see Shockley, Electrons and Holes in Semiconductors, page 302, or Shockley, Sparks, and Teal, Physical Review 83, 151 (1951)) is constant. In this case, it is not constant, and it drops by $kT\ln_e[I_m/I(0)]\doteq0.7kT$ when it reaches $x=0$.

At $x=0$, the field is zero, so that the current is carried by diffusion and $$J=-Dqdn/dx \quad (3.9)$$

so that the value of $dn/dx$ is $$dn/dx=-J/qD \quad (3.10)$$

The value of $n(0)$ itself may be estimated by taking $$I(0)=L\exp[-qV(0)/kT] \quad (3.11)$$

i. e., by assuming the integral is equal to the peak value of the integrand times a distance L. By virtue of the cancellation of the exponentials in (3.5), this gives $$qn(0)\doteq JL/D \quad (3.12)$$

which leads to $$J=qn(0)D/L \quad (3.13)$$

In Section IV, an exact expression will be derived for a particular potential distribution.

The value of $n(0)$ may be expressed in terms of the rise in the potential maximum above the Fermi level in the N-region. On this basis, we have $$n(0)=\tfrac{1}{2}N_c\exp q[V(0)-V_F]/kT \quad (3.14)$$

where $q[V_F-V(0)]$ is the energy above the Fermi level of an electron at rest at $x=0$. (See Electrons and Holes in Semiconductors, page 240, Equation 11, and page 308, Equation 18.) The factor of (½) comes from the approximation that $I(0)=(\tfrac{1}{2})I_m$.

Putting this value of $n(0)$ in the expression for current gives $$J=(qDN_c/2L)\exp\{q[V(0)-V_F]/kT\} \quad (3.15)$$

From this it follows that changes in height of $V(0)$ which do change L change the current density at a rate $$dJ/dV(0)=qJ/kT \quad (3.16)$$

corresponding to a conductance per unit area equal to current density J divided by voltage $kT/q$. (In passing, we note that differentiating the Child's law analog gives a much smaller conductance of $2J/V$ when V is large compared to $kT/q$.)

IV. *The parabolic potential approximation*

In order to make the above theory somewhat more quantitative, we shall assume that near the maximum we may write $V(x)$ in the form $$V(x)=V(0)+(kT/q)(x/L)^2 \quad (4.1)$$

The integrals referred to then are expressible in terms of the error function or probability integral, and we have $$I(x)=\exp(-qV(0)/kT)(L\pi^{1/2}/2)[1-\text{erf}(x/L)]$$

where $$\text{erf}\ (x/L)=2\pi^{-1/2}\int_0^{x/L}\exp\ (-y^2)dy \quad (4.2)$$

From this we find that $$I(-\infty)=2(L\pi^{1/2}/2)\exp(-qV(0)/kT \quad (4.3)$$
$$I(-L)=1.842(L\pi^{1/2}/2)\exp \quad (4.4)$$
$$I(0)=1(L\pi^{1/2}/2)\exp \quad (4.5)$$
$$I(+L)=0.1577(L\pi^{1/2}/2)\exp \quad (4.6)$$

The current carried by drift at $x=+L$ may be calculated. At $x=+L$, the field is $$E=-dV/dx=-2kT/qL \quad (4.7)$$

and the drift current is $$J(\text{drift})=-qn\mu E \quad (4.8)$$
$$=(2\mu kT/qL)(J/D)\exp\{[qV(0)/kT]+1\}I(L)$$
$$=(J/L)e(L\pi^{1/2})\cdot 0.1577$$
$$=0.76J \quad (4.9)$$

Thus, the current is carried primarily by drift as soon as a point with a potential energy drop of $kT$ is reached, only 24 percent of the current being carried by diffusion.

The relationship of current to density at the maximum for the parabolic approximation at the maximum is found by solving for J in the expression for $qn$ in terms of J/D, etc. This gives $$J=(2/\pi^{1/2})Dqn(0)/L$$
$$=1.13Dqn(0)/L \quad (4.10)$$

a value slightly larger than the crude estimate of $qDn(0)/L$ given in Equation 3.17.

V. *The self charge approximation*

The conclusions just presented are applicable no matter what distribution of charges produces the maximum. For the case of the N+IN+ structure, the electrons themselves produce the charge. In other cases, it may be advantageous to have an N+P–N+ structure, the P-region being substantially intrinsic so that some of the space charge is produced by acceptors. If the space charge is produced chiefly by a uniform density of acceptors, then the potential will vary as $x^2$ near its maximum, as may be seen by solving Poisson's equation $$\kappa\epsilon_L d^2V/dx^2=-\rho=+qNa \quad (5.1)$$

leading to $$V=V(0)+(qNa/2\kappa\epsilon_L)x^2 \quad (5.2)$$
$$=V(0)+(kT/q)(x/L)^2$$

with $$L=(2\kappa\epsilon_L kT/q^2Na)^{1/2}=(\eta/qNa)^{1/2} \quad (5.3)$$

where $$\eta\equiv\kappa\epsilon_L kT/q \quad (5.4)$$

The quantity $\eta$ occurs frequently in the theory, and we give its values for several cases in Section VI.

If the space charge is produced by the electrons themselves, the potential will not be accurately quadratic since the space charge dies away rapidly to the right and builds up rapidly to the left of the maximum. For purposes of estimating orders of magnitude which suffice for many design purposes, however, we may assume that the space charge is substantially uniform over a region lying within kT of energy of the maximum. We may then take for L the value $$L=[2\eta/qn(0)]^{1/2} \quad (5.5)$$

Inserting this value into the Expression 4.10 for the current, we have $$J=(2/\pi^{1/2})Dqn(0)/L$$
$$=D[qn(0)]^{3/2}(2/\pi\eta)^{1/2} \quad (5.6)$$
$$=D\rho(0)^{3/2}(2/\pi\eta)^{1/2}$$

where $\rho(0)$ is the charge density of the electrons at $x=0$:

$$\rho(0)=qn(0) \quad (5.7)$$

Since $n(0)$ varies as $\exp q[V(0)-V_F]/kT$, the conductance over the maximum for this case of space charge due to the electrons themselves is $$dJ/dV(0)=3qJ/2kT \quad (5.8)$$

an expression (3/2) as large as (3.16) in which L was assumed independent of V(0).

The equation for J can be solved for $\rho(0)=qn(0)$ $$\rho(0)=qn(0)=(J/D)^{2/3}(\pi\eta/2)^{1/3}$$
$$=2\times10^{-6}J^{2/3}\text{ coulomb/cm.}^3 \quad (5.9)$$

for $D=90$ cm.²/sec. corresponding to electrons in germanium. This equation may be solved for J:

$$J=3.5\times10^{8}\rho^{3/2}\text{ amp./cm.}^2 \quad (5.10)$$

In heavily doped N-type germanium, the carrier density may be as high as $10^{19}$ cm.$^{-3}$ corresponding to a charge density of 1.6 coulombs/cm.³. This charge density corresponds to a current density of $7\times10^{8}$ amperes/cm.². From this it is evident that currents enormously larger than thermionic currents can be drawn from the cathodes of the analog-structures before the potential maximum corresponding to space charge limited emission is wiped out and the field reaches directly into the N-type emitter body.

It is also of interest to consider the current density corresponding to a charge density $qn_i$, which we shall take to be $$qn_i=1.6\times10^{-19}\times2\times10^{13}=3\times10^{-6}\text{ coulombs/cm.}^3 \quad (5.11)$$

This corresponds to a current density of about 1.8 amp./cm.². The significance of this value is as follows: For current densities substantially larger than this value, the electron density at the maximum in Fig. 2B will be larger than $n_i$. Now, if the product of electron density $n$ and hole density $p$ exceeds $n_i^2$, then there will be an excess of recombination over generation of hole electron pairs. This follows from the fact that for non-degenerate hole and electron densities $pn=n_i^2$ for thermal equilibrium, see Shockley loc. cit. chapter 12, section 12.5, Equation 2. Evidently, if $pn$ is greater than $n_i^2$, there will be an excess of recombination. Some holes will be generated throughout the space region and will then flow to the maximum point in the curves of Fig. 2B and Fig. 3. At $x=0$, the hole density will tend to decay towards a value of $n_i^2/n(0)$.

VI. *Reduced units and design charts*

For purposes of design, it is convenient to have numerical values available for a number of the quantities that frequently occur in the theory. We shall consider first those associated with the self space charge of the electrons. For this purpose, we consider the quantity $\eta$.

$$\eta=\kappa\epsilon_L kT/q \quad (6.1)$$

$\eta$ has the dimensions of charge per unit length. It is convenient to express it in coulombs per cm. Its values for germanium and silicon are $$\text{Ge}:\eta=3.6\times10^{-14}\text{ coulombs/cm.}$$
$$\text{Si}:\eta=2.7\times10^{-14}\text{ coulombs/cm.} \quad (6.2)$$

The values of $\rho(0)$, J and L discussed in Section V are defined in terms of $\eta$ and certain numerical coefficients derived by applying the parabolic potential equations to the self space charge case. A set of simplified relationships between the quantities may be derived which do not correspond to any particular approximation nor to an exact solution, but are readily adaptable to any case of interest. We shall express these quantities as functions of J and shall refer to them as "reference" values using the subscript $r$ to identify them.

The quantity $\rho_r$ is a simplified form of Equation 5.9:

$$\rho_r=(J/D)^{2/3}\eta^{1/3} \quad (6.4)$$

and $L_r$ is a simplified form resulting from substituting (6.4) into (5.5)

$$L_r=(\eta D/J)^{1/3} \quad (6.5)$$

A third quantity of interest is $Q_r$, which is approximately the amount of charge per unit area within a layer $L_r$ thick near the potential energy maximum. $Q_r$ is defined as $$Q_r=\rho_r L_r=(J/D)^{1/3}\eta^{2/3} \quad (6.6)$$

The last quantity is approximately the time required to diffuse a distance $L_r$. It is defined as $$\tau_r=L_r^2/D=(\eta/J)^{2/3}D^{-1/3} \quad (6.7)$$

In Figs. 5, 6, 7, and 8, these four functions are plotted for electrons and holes in germanium and silicon at room temperature, the values being given in the centimeter system.

On these charts, values are indicated at which $\rho_r$ is equal to the estimated values of $qn_i$ at room temperature. It is seen at once that for current densities in a convenient working range in the order of 1 ampere/cm.$^2$, $\rho_r$ may be made much greater than $qn_i$ by using silicon and less than $qn_i$ by using germanium.

Figure 9:
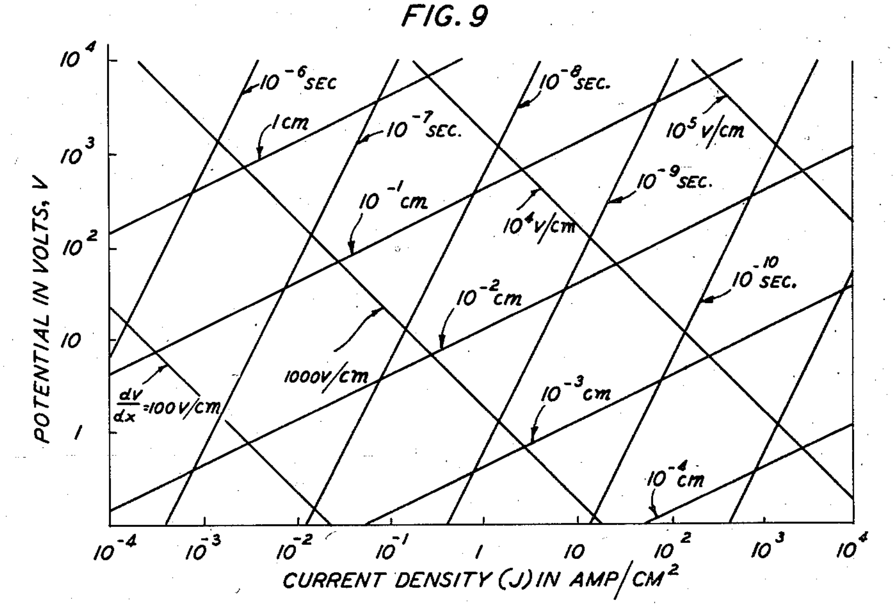

It is also advantageous to have a plot giving the Child's law analog. The pertinent equations for electrons in germanium are (2.20), (2.10), and (2.11), all evaluated using the L system as defined in connection with (2.17). The resulting relationships are shown in Fig. 9.

It is also convenient to have charts showing how far space charge will penetrate into extrinsic material. Again, a useful relationship is obtained by solving Poisson's equation in one dimension for a boundary condition that V and $dV/dx$ both vanish at $x=0$. The solution, as discussed in connection with (5.2), is $$V=qNx^2/2\kappa\epsilon_L \qquad (6.8)$$

This equation applies to penetration of space charge into a uniform region in which the magnitude of $N_d-N_a$ is N; for this case, $x=0$ corresponds to the point of deepest penetration. This case occurs in P-N junctions having abrupt transitions and is discussed in W. Shockley, Bell System Technical Journal, 28, 435, Equations 2.49 and 2.50. The maximum electric field and capacity per unit area of such a space charge layer are given by $$E=qNx/\kappa\epsilon_L \qquad (6.9)$$

and $$C=\kappa\epsilon_L/x \qquad (6.10)$$

For $\kappa=16$, the dielectric constant of germanium $\epsilon_L=8.85\times10^{-14}$ farads/cm. and $q=1.6\times10^{-19}$ coulombs, these equations become $$C=1.41\times10^{-12}/x \text{ (farads/cm.}^2) \qquad (6.11)$$
$$E=1.6\times10^{-19}\ N/C \qquad (6.12)$$
$$C^2=\kappa\epsilon_0Nq/2V=1.13\times10^{-31}\ N/V \qquad (6.13)$$

Figure 10:
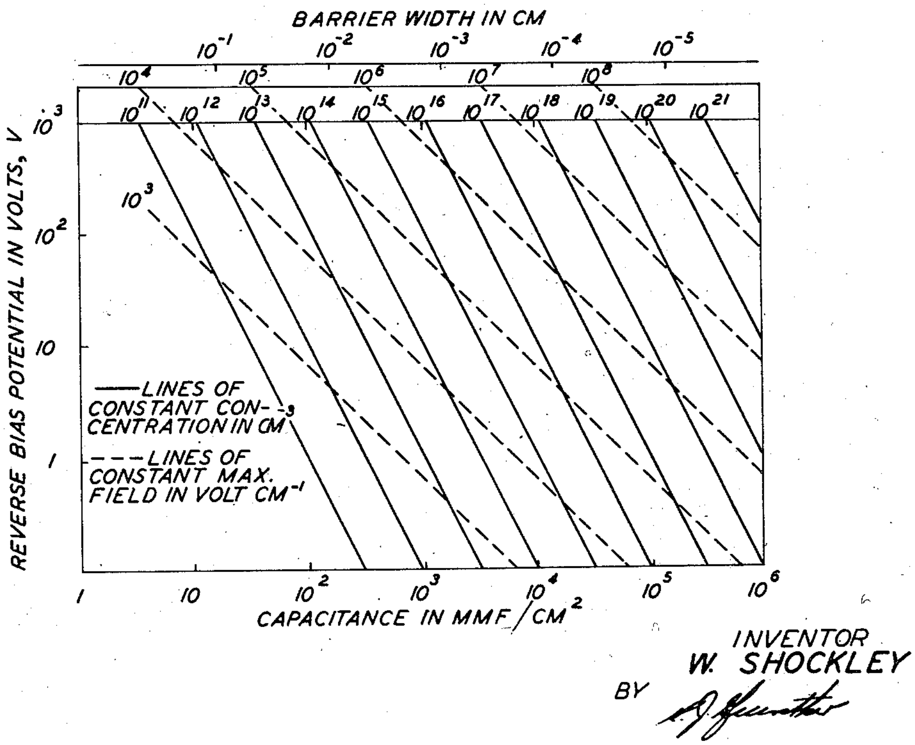

These relationships are plotted in Fig. 10.

The general relationship between electric field and structure is given by (6.9). For a field of $10^3$ volts/cm., (6.9) reduces to $$N=5.5\times10^8\ \kappa/x \qquad (6.14)$$

an expression discussed in Section X*b*.

VII. *The suppression of hole accumulations*

In some applications, it is desirable to have the hole density much smaller than the electron density so that the equations presented above and their consequences are applicable. This can be accomplished by making the major portion of the space region of long lifetime material and the portion just in front of the source of low lifetime material and operating under conditions with $n(0)>n$. Under these conditions, the generation of holes in the space region will be small, and any accumulation in front of the source will be quickly recombined because of the high recombination rate there.

Structures of controlled distribution of lifetime can be formed in various ways. For example, it is known that heat treatment produces centers that aid recombination and so does bombardment by nuclear particles (see Shockley, Electrons and Holes in Semiconductors, page 347). It has also been established that nickel is very effective in reducing lifetime. The addition of 1 milligram of nickel to a 100 gram melt of germanium reduces lifetime to a few microseconds or less in material that would otherwise be hundreds or thousands of microseconds. By this technique, an ingot with a sharp boundary between long and short lifetime may be formed.

From this a structure may be cut with the nickel in the optimum location. Alternatively, nickel may be diffused in from the surface.

Since the tendency of holes to accumulate in front of the source depends on $n_i^2/n(0)$, it is evident that the use of materials with wider energy gaps than germanium would be advantageous. The energy gap in silicon is wider by about 0.4 electron volt so that for it $n_i^2$ is less by a factor of $6\times10^6$. This will permit operation with negligible hole accumulations at much lower currents than for germanium. This is evident in Fig. 5 from which it is seen that current densities in excess of 1 amp./cm.$^2$ are required to make $\rho_r$ exceed $qn_i$ in germanium, whereas current densities $10^{-3}$ times smaller suffice for silicon. Silicon carbide has a still wider energy gap of more than three electron volts and may be operated with even smaller currents or at higher temperatures.

VIII. *The role of hole accumulations*

Although we have treated first the prevention of hole accumulation at the potential energy maximum of Fig. 2B, it should be pointed out that the presence of an accumulation of holes in this region is not injurious for all applications and may be desirable for some. We shall therefore analyze the role played by accumulated holes in this region. We shall consider first the case in which a total number P of holes are present per unit area of the emitter. We shall initially neglect recombination and imagine the supply of holes to be permanent. We shall first consider the size of P which has a significant effect. It is evident that if the number of holes in the region $-L<X<+L$ of Fig. 3 is much less than the number of electrons in this same region, the holes will be relatively unimportant. It should be noted that the holes are distributed in this region in proportion to the ordinates of Fig. 4 and for the assumption of parabolic potential, 84 percent of the holes lie between +L and −L. The charge per unit area of electrons in this region will be of the order of magnitude of $Q_r$ introduced in Section VI by Equation 6.6. If $qP$ exceeds this value by a large factor, then the space charge of holes will have a major influence on the potential distribution.

We shall next suppose that qP is much greater than $Q_r$ and that the current is maintained at a value J. Under these conditions, we would expect the potential distribution to still be a curve with a single maximum. However, this maximum must now be broad because, if it were narrow, the accumulation of holes would be concentrated, and Poisson's equation could not be satisfied. The principal features of the correct distribution of potential are explained in Figs. 11A, 11B, and 11C.

Figure 11A:
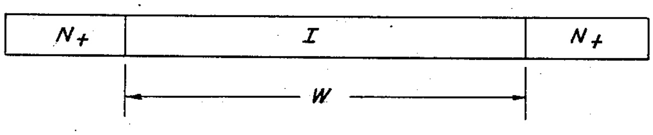
Figure 11B:
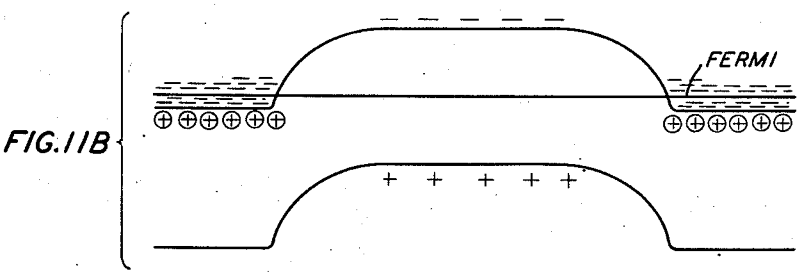
Figure 11C:
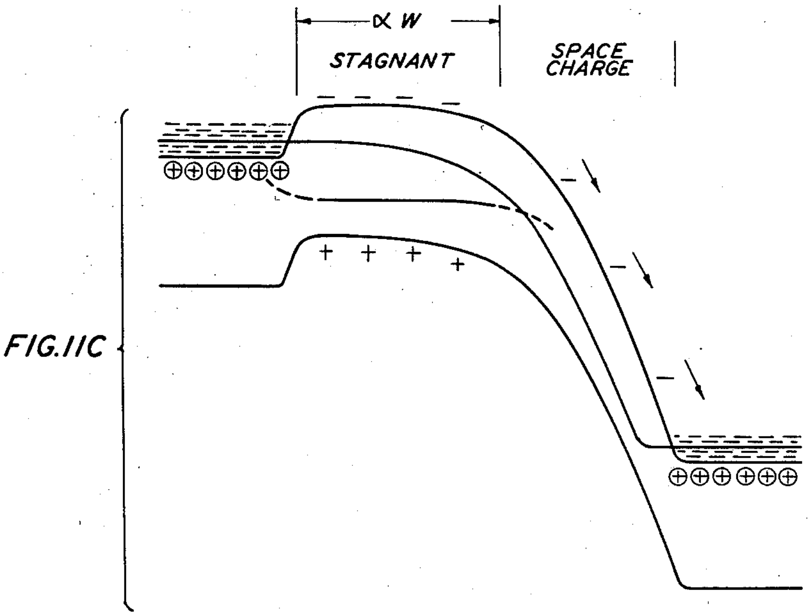

In Fig. 11A, we represent the N+IN+ structure and by the shape of the potential energy curves of Fig. 11B, we indicate that it is wide compared to a Debye length. If this is not the case, $n(0)$ will be large compared to $n_i$, and the situation is not one of the class we are considering. In Fig. 11C, we represent the condition with a moderate applied potential. It is to be noted that:

(I) The number of holes in the "stagnant" region is approximately equal to the number of holes in 11B.

(II) The density of holes and electrons at the left edge of the stagnant region is greater than for 11B, and the curvature of potentials is also greater.

(III) The space region is divided into two parts with the stagnant part nearly electrically neutral and the remainder a space charge region.

We shall consider condition (I) first. Since recombination of holes and electrons takes place through imperfections or traps, the rate of recombination per unit volume in neutral intrinsic germanium is approximately $$(p-n_i)/\tau=(n-n_i)/\tau \qquad (8.1)$$

where $\tau$ is the lifetime. The reason for this relationship rather than a bimolecular one of the form $(pn-n_i^2)/n\tau$ is that the rate at which electrons are trapped is proportional to the electron density so long as the traps are filled to some definite fraction by electrons. This fraction will be independent of density of carriers if both hole and electron densities are equal, because the rates at which a trap can capture an electron when empty or a hole when occupied maintain the same proportion. On the basis of this reasoning, we see that the net rate per unit area at which pairs are recombined is $$\int^{W}_{0}(p-n_i)dx/\tau = P-n_iW)/\tau \quad (8.2)$$

if we assume that the generation of holes all occurs in the width W. Hence, we conclude that $$P=n_iW \quad (8.3)$$

for the steady state. The quantity $n_i$W, is however, almost exactly the number of holes in the intrinsic case. This establishes the reason for condition (I).

For the cases of interest in this section, the width of the stagnant region will be less than W by a factor $\alpha$, as represented in Fig. 11. Furthermore, as will be evident from the subsequent analysis, $n$ and $p$ are both substantially larger than $n_i$ at the left edge of the stagnant region, and the Debye length that characterizes the transition from the potential maximum to the $N_+$-region on the left will be very short. In the subsequent analysis of this section, we shall consider this transition distance to be negligible and shall let $x=0$ correspond to the left edge of the I-region and to the maximum in potential of Fig. 11C.

Conditions (II) and (III) may be understood by considering the details of the solutions.

In the stagnant region, the hole current is assumed negligibly small compared to the electron current. Consequently, we may write $$J=-qD(dn/dx)+q\mu n dV/dx \quad (8.4)$$

$$0=\frac{1}{b}(qDdp/dx+q\mu p dV/dx) \quad (8.5)$$

where $b$ is the ratio of electron mobility to hole mobility. (See Shockley, Electrons and Holes in Semiconductors, page 299, and note that J is positive for currents in the $-x$ directions.) In this region, the space charge is almost zero and, except near the ends, the approximation $$p=n \quad (8.6)$$

is valid. Multiplying the second equation by $b$ and subtracting from the first gives $$J=-2qDdn/dx \quad (8.7)$$

From this we conclude at once that half the current is carried by the diffusion term of (8.4) so that half must also be carried by the drift term.

Equation 8.7 can be integrated to give $n$ as a function of $x$ in the form $$n=\text{const}-(J/2Dq)x \quad (8.8)$$

Figure 12A:
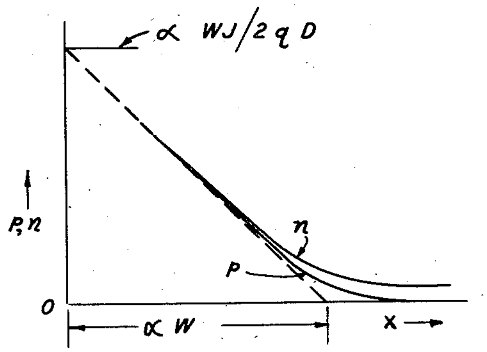
Figure 12B:
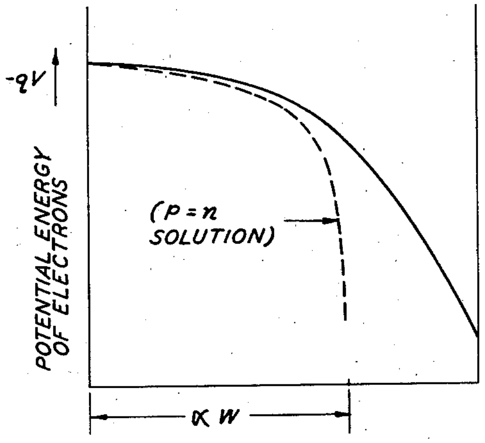

In Fig. 12A, we show this relationship as a dashed line which goes to zero at $$x=\alpha W \quad (8.9)$$

so that $$n=(J/2Dq)(\alpha W-x) \quad (8.10)$$

As represented in Fig. 11A, W is the width of the intrinsic region and $\alpha$W that of the stagnant region.

Although $n=p$ is a good approximation, there is a slight excess of electrons over holes, and this gives rise to the potential variation which carries the drift current. The potential is readily calculated from $p$ which must be expressable since the hole current is zero by a Boltzmann factor:

$$p=p_0 \exp(-qV(x)/kT)= (J/2Dq)(\alpha W-x) \quad (8.11)$$

The potential and the electric field may be calculated from this equation. The field may be more readily found, however, from the condition that the drift term of (8.4) must carry half the current:

$$(J/2)=q\mu n dV/dx \quad (8.12)$$

which leads at once to $$dV/dx=J/2p\mu n \quad (8.13)$$

We may determine what space charge density is necessary to produce this field by evaluating $d^2V/dx^2$ and applying Poisson's equation. The necessary differentiation can be expressed with the aid of $$dn/dx=J/2Dq \quad (8.13a)$$

Thus, the space charge density corresponding to $d^2V/dx^2$ is $$\rho=-\kappa\epsilon_L d^2V/dx^2=\kappa\epsilon_L(J/2q\mu n^2)(-J/2Dq) =-(\eta/4)(J/Dqn)^2 \quad (8.14)$$

Hence, the condition of neutrality cannot be exactly correct, and the electron density must exceed the hole density. Over most of the stagnant region, this density is small compared to charge density of the electrons, as may be seen by evaluating their ratio:

$$\rho/(-qn)=\eta\left(\frac{J}{D}\right)^2\left(\frac{1}{qn}\right)^3 \quad (8.15)$$

This ratio is unity when $$qn=(J/D)^{2/3}\eta^{1/3}\equiv\rho_r \quad (8.16)$$

where $\rho_r$ is the quantity of Equation 6.4 evaluated for electrons. This equation shows that the approximation of equal hole and electron densities is good for electron charge densities larger than $\rho_r$; for these larger densities, a very small perturbation in the approximate solution will give the exact solution for which Poisson's equation is satisfied.

The exact solution deviates substantially from the approximate one, represented by the dashed line in Fig. 12A, as $qn$ approaches $\rho_r$. The condition $n=\rho_r/q$ occurs on the approximate solution at a distance.

$$(\rho_r/q)\div(J/2qD)=2\rho_r D/J \quad (8.17)$$

from the point $\alpha$W in Fig. 12A. This expression is readily found to be 2$L_r$ where $L_r$ is defined in (6.5):

$$L_r=(\eta D/J)^{1/3}=\rho_r D/J \quad (8.18)$$

Since at $x=\alpha W-2L_r$ the value of $n$ and its gradient, which is approximately $n/2L_r$, are comparable to the solution in Section V in the absence of holes, it is evident that the stagnant solution makes a continuous transition to the electron space charge solution in the neighborhood of the point $x=\alpha W$ in Fig. 12A. Similarly, the potential distribution, shown as potential energy for an electron in Fig. 12B, makes a smooth transition from the stagnant solution to the space charge solution.

The total number per unit area of holes is the area under the curve for $p$ in Fig. 12A and thus approximately $$P=\alpha^2W^2J/4qD \quad (8.19)$$

The ratio of the charge $q$P of the holes to $Q_r$, defined in Equation 6.6, is a measure of the strength of the stagnant region. It may be expressed in terms of the ratio of $\alpha$W to $L_r$ as follows:

$$\frac{qP}{Q_r}=\frac{\alpha^2W^2J/4D}{(J/D)^{1/3}\eta^{2/3}}=\left(\frac{\alpha W}{2L_r}\right)^2 \quad (8.20)$$

We shall refer to this result in Section IX. For the condition that the total number of holes is independent of applied potential, we find from (8.3) and (8.19) that $$\alpha^2=4qn_iD/WJ \quad (8.21)$$

We shall next use this relationship to determine $\alpha$ in terms of V and W.

In order to determine $\alpha$, we note that, as is justified below, the major part of the potential drop occurs to the right of $\alpha W$, where the space charge solution holds, so that we may write Equation 2.9 in the form $$J=(9/8)\kappa\epsilon_L\mu V^2/W^3(1-\alpha)^3 \quad (8.22)$$

Inserting this for J, we obtain an equation for $\alpha$:

$$\alpha^2(1-\alpha)^{-3}=(64/9)[(qn_iW^2/2\kappa\epsilon_L)/(kT/q)](kT/qV)^2 \quad (8.23)$$

The first algebraic expression is the voltage of a space charge layer W wide of charge density $qn_i$. The square bracket is this voltage divided by $kT/q$, or thermal voltage. The second term is the square of the ratio of $(kT/q)$ to the applied voltage.

We may see from these observations that if a voltage V is sufficient to produce a space charge layer of width W in substantially intrinsic germanium at low temperatures where $n_i$ is negligible, V may be insufficient to eliminate a stagnant region at room temperature. In some specimens of germanium, the residual donor minus acceptor density is less than $n_i/10$ at room temperature. A voltage $$V=qn_iW^2/20\kappa\epsilon_L \quad (8.24)$$

will penetrate such a layer in the absence of holes and electrons. Inserting this voltage in the equation for $\alpha$ gives $$\alpha^2(1-\alpha)^{-3}=(64/9)(10)(kT/qV) \quad (8.25)$$

If V is of the order of 10 volts, the right side becomes 0.18 leading to $\alpha \cong 1/4$. Hence, a substantial portion of the $N_+IN_+$ structure is a stagnant region.

We shall next obtain an estimate of the drop in potential across the stagnant region and show that it is so small as to justify its neglect compared to applied voltages. This voltage drop occurs between the maximum taken as $x=0$ and the point where $qn=\rho_r$ and may be estimated from the Boltzmann factor for holes. The ratio of hole densities between these two points is approximately $$\alpha W/L_r$$

and this leads to a voltage change of $$(kT/q)\ln \alpha W/L_r \quad (8.26)$$

In germanium at room temperature, $L_r$ is approximately the Debye length of about $10^{-4}$ for the case of $\rho_r \doteq qn_i$. If $\rho_r$ is less than $qn_i$, the value $L_r$ will be larger. W will probably be much less than $10^{-1}$ cm. Hence, the maximum drop expected will be less than $(kT/q)\ln 1000 = 6.9/40 = 0.17$ volt. This potential drop will in most cases be negligible compared to the applied potential so that we may take the entire applied voltage V as falling across the space charge region.

IX. *Current gain in stagnant region*

We shall next consider the behavior of a stagnant region when a hole current $J_p$ is deliberately introduced by an external agency as well as by thermal generation. We shall find that by this means, current gain can be obtained. For example, if the $N_+IN_+$ structure is operated so as to form a stagnant region, and X-rays illuminate the entire body, then an added current of holes will flow into the stagnant region. If the lifetime of holes in this region is $\tau$, then the number of holes is $$qP=J_p\tau$$

where $J_p$ is the total current of holes flowing into the region.

If the electron current is J, then the width $\alpha W$ of the stagnant region is related to P by Equation 8.19 so that $$qP=(\alpha W)^2J/4D \quad (9.2)$$

From (9.1) and (9.2) we may derive a relationship useful below that $$J_p/J=(\alpha W)^2/4D\tau \quad (9.3)$$

This equation is one-fourth the square of ratio of the width of the stagnant region to the distance an electron will diffuse in a time $\tau$. For reasonable values of the parameters, this value may be quite small, as we shall show by supposing that $\alpha W$ is $3\times10^{-3}$ centimeters and $\tau$ is $10^{-6}$ seconds and $D=90$ cm.$^2$/sec. (corresponding to electrons in germanium). Under these conditions, $$J_p/J=9\times10^{-6}/3.6\times10^{-4}=1/40 \quad (9.4)$$

This factor is closely related to the current gain, as we shall shortly see.

If we consider that the applied voltage drop V falls entirely across the space charge region of width $(1-\alpha)W$, then the voltage is given by $$V^2=(8/9)JW^3(1-\alpha)^3/\kappa\epsilon_L\mu \quad (9.5)$$

Let us now consider the effect of small deviations $\delta J_p$ and $\delta J$ in current in producing a small change $\delta V$ in V. Taking the logarithm of both sides of the $V^2$ equation and then producing the small disturbance gives $$2\delta V/V=(\delta J/J)-3\delta\alpha/(1-\alpha) \quad (9.6)$$

Since $\alpha^2$ is proportional to $J_p/J$, we have $$2\delta\alpha/\alpha=\delta J_p/J_p-\delta J/J \quad (9.7)$$

This leads to $$2\delta V/V=\left(1+\frac{3\alpha}{2(1-\alpha)}\right)\frac{\delta J}{J}-\frac{3\alpha}{2(1-\alpha)}\frac{\delta J_p}{J_p} \quad (9.8)$$

From this it follows that at constant voltage, i. e., with $\delta V=0$, the ratio of change in J to change in $J_p$ is $$\frac{\delta J}{\delta J_p}=\frac{J}{J_p}\cdot\frac{3\alpha}{2+\alpha} \quad (9.9)$$

For $\alpha=0.5$ and 0.1, respectively, this gives $$\frac{\delta J}{\delta J_p}=\frac{3}{5}\frac{J}{J_p} \text{ and } \frac{1}{7}\frac{J}{J_p} \quad (9.10)$$

For $J/J_p=40$, these give current gains of 24 and 6, respectively.

Although the foregoing analysis teaches the methods necessary to design structures utilizing current gain through stagnant regions, it may be helpful to derive a few additional relationships. Inserting Equation 9.3 into the equation for current gain gives $$\frac{\delta J}{\delta J_p}=\frac{12D\tau}{W^2\alpha(2+\alpha} \quad (9.11)$$

From this we see that with decreasing $\alpha$, the current gain rises. A decrease in $\alpha$ may be accomplished by raising the voltage and widening the space charge region. However, in order to maintain a stagnant region, this will require an increase in hole current. In fact, $J_p$ varies as $J^{1/3}$ if we maintain a stagnant region of constant strength as defined in Equation 8.20. Thus, if we require a fixed value of $qP/Q_r$, say 4 so that by Equation 8.20 the region is about $4L_r$ wide, then we shall have using (6.5)

$$\alpha W=4L_r \propto J^{1/3} \quad (9.13)$$

Hence for small values of $\alpha$, the current gain varies as $J^{1/3}$. The value of $J_p/J$ varies as $\alpha^2$ and hence as $J^{-2/3}$ and $J_p$ itself as $J^{1/3}$.

If we introduce the time $\tau_r$ characteristic of the current J through the relationship (6.7), $$\tau_r=L^2/D=(\eta/J)^{2/3}D^{-1/3} \quad (9.14)$$

then we may express $J_p/J$ in terms of $qP/Q_r$ and $\tau_r/\tau$. From (8.20) we have $$qP/Q_r=(\alpha W/2L_r)^2 \quad (9.15)$$

and from (9.3) we have $$J_p/J=(\alpha W)^2/4D\tau=(qP/Q_r)$$
$$(L_r^2/D\tau=(qP/Q_r)(\tau_r/\tau) \quad (9.16)$$

It may be noted that in the stagnant condition, the electrons at the left edge have their imref at almost the same value as in the N-region to the left and not reduced by as much as $(kT/q)\ln 2$ as is the case for a symmetrical potential. Since recombination of holes is occurring in this region, the imref of holes is such as to produce a forward bias and drive holes into the N-region at the left. This process can reduce the effective lifetime of holes in the stagnant region. The mathematics for currents of this sort is fully developed in the cited references. (Shockley, Bell System Technical Journal, July 1949, page 435). Hence, it is possible to use hole recombination in the source body to control the actions of holes in the stagnant region by making the N+ region at the left of short lifetime material by methods like those of Section VII, for example.

Finally, we should remark that although the treatment just presented has been based on a stagnant region of considerable extent, current gain will occur for small values of $qP/Q_r$. Since the mechanism of current gain of this sort is clearly established by the considerations of the stagnant case, we shall not further elaborate by presenting mathematical analyses for the other case.

X. *Swept intrinsic structures*

With the exception of the stagnant region discussed above, most of the considerations have been directed towards situations in which the space charge arises preponderantly from the moving carriers. In some applications, this carrier density may be less than the carrier density in intrinsic germanium at room temperature. It is possible to operate under these conditions by producing what may be referred to as "Swept Intrinsic Structures" by the application of electric fields.

*a.* THE EFFECT OF THERMALLY GENERATED CARRIERS

In order to illustrate this principle, we consider the structure of Fig. 13. It comprises a square column of semiconductive material with four columnar zones of alternately P+ and N+ material.

If voltages $+V_a$ are applied to the N+ electrodes and $-V_a$ to the P+ electrodes, then the distribution of potential will have the general form shown in Fig. 14. If there is no space charge in the space region, then the potential must satisfy Laplace's equation and can be represented to a good approximation by $$V(x,y)=(V_a/2)(x^2-y^2) \qquad (10.1)$$

where the $x$-axis passes through the center of the N-regions and the $y$-axis passes through the center of the P-regions, and 2R is the distance between the inside edge of opposite electrodes. Equipotentials for this potential are rectangular hyperbolae similar to the curves of Fig. 14.

If the distribution of potential were plotted as a relief map, it would represent a saddle shaped surface. On this surface, a hole would tend to drift down hill in the direction of the arrows. Electrons will drift in the opposite direction.

It is thus evident that any holes or electrons generated in the region will be swept out by the fields. If this sweeping process is quick enough, the charge density of the remaining holes and electrons will have a negligible influence on the potential. We shall refer to this condition as swept intrinsic. This conditoin can be achieved in germanium of properties heretofore indicated.

To establish this, an estimate of order of magnitude will suffice. We shall make this estimate by assuming that the rate of generation of hole electron pairs in the swept material is the same as in the case of thermal equilibrium. For thermal equilibrium, the rate of generation equals the rate of recombination, and this latter is $$\text{rate of recombination}=n_i/\tau_i$$

where $\tau_i$ is the lifetime of the material. Typical values for germanium of $\tau_i$ are $10^{-3}$ to $10^{-4}$ sec. The value of $n_i$ is about $2\times10^{13}$ cm.$^{-3}$. In the swept condition, a generated hole, for example, persists for a time $\tau$ on the average where $\tau$ is the average transit time from point of generation to an electrode. Since the electric field is approximately $$E_a=2V_a/R \qquad (10.2)$$

the drift velocity is $2\mu V_a/R$ and the transit time is about $$\tau=R/(2\mu V_a/R)=R^2/2\mu V_a \qquad (10.3)$$

If $\tau$ is much less than $\tau_i$, which we shall show below to be readily achievable, then the generation builds up only to a fraction $\tau/\tau_i$ of the intrinsic value. Hence, the charge density of holes will be approximately $$\rho_p=qn_i\tau/\tau_i \qquad (10.4)$$

This density will be to some degree compensated by electrons. However, if it persisted uniformly over a cylinder of radius R, it would produce a field at the surface given by equating the displacement to the charge inside the cylinder:

$$2\pi RD=2\pi R\kappa\epsilon_L E_p=\pi\rho_p R^2 \qquad (10.5)$$

$$E_p=\rho_p R/2\kappa\epsilon_L \qquad (10.6)$$

If this field is small compared to the applied field, which is $E_a$, then the thermally generated carriers will have a small effect on the potential distribution. The ratio of the two fields is $$\frac{E_p}{E_a}=\frac{\rho_p R}{2\kappa\epsilon_L}\cdot\frac{R}{2V}=\frac{qn_iR^4}{4\kappa\epsilon_L\tau_i\mu V^2}=\frac{q\mu n_i}{4\kappa\epsilon_L\tau_i}\left(\frac{R^2}{\mu V}\right)^2=\frac{\tau^2}{4\tau_p\tau_i} \qquad (10.7)$$

In this expression $\tau_p$ is the "dielectric relaxation time" corresponding to the conductivity of holes in intrinsic material.

$$\tau_p=\kappa\epsilon_L/q\mu n_i=1.41\times10^{-12}\div(180)^{-1} \doteq 3\times10^{-10}\ \text{seconds} \qquad (10.8)$$

where we have taken $q\mu n_i$ as ½ the conductivity of intrinsic germanium or the reciprocal of 180 ohm cm.

The transit time $\tau$ may be estimated by supposing that the fields lie near the limit of the linear range of drift velocity so that $V/R=10^3$ volts/cm. and $\mu V/R$ is about $1.5\times10^6$ cm./sec. for holes so that $$\tau\doteq6\times10^{-7}R \qquad (10.9)$$

The ratio of fields then becomes $$\frac{E_p}{E_a}=\frac{3.6\times10^{-13}}{12\times10^{-10}}\frac{R^2}{\tau_i} \qquad (10.10)$$

If R has the very large value of 1 mm. or $10^{-1}$ cm. and $\tau_i=1000\mu$ sec.$=10^{-3}$, $E_p/E_a$ is less than $10^{-2}$ so that the material is swept. Even if $\tau_i=10^{-6}$ sec., a swept condition will be achieved in a structure with $R=4$ mils or $10^{-2}$ cm. with $E_p/E_a\doteq0.03$.

*b.* THE EFFECT OF IMPURITIES

If the thermally generated carriers are swept out of substantially intrinsic material, the residual charge density due to impurities may become important. This charge density can be observed experimentally by lowering the temperature to such a point that $n_i$ is small compared to $N_d-N_a$, and measuring $\tau$.

We shall next estimate the effect of a donor density of $10^{12}$ cm.$^{-3}$ in germanium. By applying Equation 10.6 to this case, we find that $$E=q10^{12}R/2\kappa\epsilon_0 \doteq 6\times10^4\ R\ \text{volts/cm.}$$

From this we see that a field of 600 volts/cm. will be produced in a structure with $R=10^{-2}$ cm. In some instances, these fields will be beneficial. In others, these effects can be reduced by applying higher voltages. This can be done since the Zener effect does not occur until fields of $10^5$ volts/cm. or higher are reached.

From the foregoing, it is evident that in order to realize conditions in which pure space charge limited emission occurs in germanium, it is necessary that the semiconductive material constituting the substantially intrinsic region be very highly purified. Preferably, the impurity densities should be less than $1/10\ n_i$. Also, in general, the donor-acceptor unbalance for this region should be such that the resistivity of the region does not deviate more than five percent from intrinsic. Quantitatively stated, for dimensions of this region in $x$ cm., the unbalance of donor and acceptor densities should be less than $5.5\times10^8\kappa/x$, as derived in Equation 6.14.

The field of $10^3$ volts/cm. referred to in connection with the above limit for the range of constant mobility corresponds to electrons in germanium. For holes in silicon, the corresponding field is about $10^4$ volts/cm. For this case, the density limit is $5.5\times10^9\kappa/x$.

Although operation in the range of constant mobility may be advantageous from the point of view of simplicity of design theory, it is not necessary to so operate, and somewhat higher alternating current impedances in the grid-collector regions of structures like that of Fig. 18 may be obtained by operating at higher fields. These fields should not, however, reach the Zener field, for this would result in large generation of hole-electron pairs. Since the Zener field for silicon and germanium is in excess of $10^5$ volts/cm., operation below the Zener field will occur for densities less than $5.5\times10^{10}\ \kappa/x$. The Zener field is discussed in detail in the application Serial No. 211,212, filed February 16, 1951, of W. Shockley, now Patent No. 2,714,702, issued August 2, 1955.

XI. *A design example—the saddle structure*

As an example, we shall consider a design for the structure of Fig. 15. For this purpose, we shall consider the structure to resemble a crude vacuum tube. For this case, the $N_+$ structures are source and drain and the P-structures are the grid.

We estimate the mu of this structure by considering the situation when no carriers are present. Under these conditions, the potential at the midpoint between the "grid wires" is affected equally by all four electrodes and is $$V(0)=0.5V_g+0.25V_c \qquad (11.1)$$

for the case of the grounded source. The mu, denoted by M to avoid confusion with $\mu$ for mobility, is thus $$M=0.5/0.25=2 \qquad (11.2)$$

We shall suppose that to a fair approximation this same relationship holds when space charge is present.

We shall take as a zero signal condition $V_g=0$, corresponding to zero current between source and grid. Under these conditions, the potential on the $y$-axis is given by $$V(y)=(V_c/4R)^2(R^2-y^2) \qquad (11.3)$$

This result can be seen by noting that the potential distribution $$0,\ 0,\ V_c \qquad (11.4)$$

for the source, grid, and drain is the sum of $$-\tfrac{1}{2}V_c,\ 0,\ \tfrac{1}{2}V_c \qquad (11.4a)$$
$$\tfrac{1}{4}V_c,\ \tfrac{1}{4}V_c,\ \tfrac{1}{4}V_c \qquad (11.4b)$$
$$\tfrac{1}{4}V_c,\ -\tfrac{1}{4}V_c,\ \tfrac{1}{4}V_c \qquad (11.4c)$$

It is evident from symmetry that (*a*) and (*b*) produce constant potentials along the $y$-axis and that (*c*) produces the saddle potential of Section X. Thus, it is evident that the required potential must be quadratic in $y$. Since (11.3) is quadratic and satisfies the correct boundary conditions, it must be the correct form.

We shall estimate the current for zero signal by treating the $y$-axis as a continuum of diodes each drawing a current proportional to $V^2(y)$. The average value of $V^2(y)$ is readily found to be $$(8/15)(V_c^2/16)=V_c^2/30 \qquad (11.5)$$

As an approximation, we assume that the diode spacing is R and the width is 2R. Consequently, the current per unit height of structure, denoted as $J_1$, is $$J_1=(3/40)\kappa\epsilon_L\mu V_c^2/R^2 \qquad (11.6)$$

The transconductance is obtained by differentiating in respect to $V_c$ and multiplying by M. This gives $$g=(3/10)\kappa\epsilon_L\mu V_c/R^2 \qquad (11.7)$$

Inserting the values for electrons in germanium gives $$g=1.5\times10^{-9}V_c/R^2\text{mhos/cm.} \qquad (11.8)$$

Before considering numerical values for $g$, we shall compare the transconductance with the capacitances. The grid-drain and grid-source capacitances will be comparable and of the order of a condenser of area 2R per unit length and spacing (1/2)R. Hence, C will be $$C=4\kappa\epsilon_0\ \text{farads/cm.} \qquad (11.9)$$

A familiar figure of merit proportional to frequency is $$g/C=(3/40)\mu V_c/R^2 \qquad (11.10)$$

Since the transit time from emitter to collector is approximately $$\tau=(4/3)(2R)^2/\mu V_c \qquad (11.11)$$

we see that $$g/C=2/5\tau \qquad (11.12)$$

Hence, the circular frequency at which the real and imaginary admittances become equal is about $2/5\tau$.

Thus, the frequency at which there is large loss of gain due to capacitative loading is nearly the same as that at which transit time effects are important. This is a general feature of many space charge limited structures.

We shall next estimate the temperature rise assuming that a copper heat conductor is connected along the length of the drain and is connected to a heat sink. Since the thermal conductivity of copper is about 4.2 watts/°K. cm., whereas for germanium it is about 0.6 watt/°K. cm., it is evident that for a structure like that of Fig. 14 the principal temperature drop will be in the germanium. Accordingly, we assume that the heat generation occurs at about a distance R from the copper and flows across a path R wide. If we let $K_g$ represent the thermal conductivity of germanium, the temperature rise will be $$\Delta T=J_1V_c/K_g$$
$$=(3\kappa\epsilon_L\mu/40K_g)(V_c^3/R^2) \qquad (11.13)$$

For $V_c/R=10^3$ volts/cm., this gives a temperature rise of $$\Delta T=0.6\text{R degrees Kelvin} \qquad (11.14)$$

Thus, for values of R of $10^{-1}$ cm. or less, the temperature rise is negligible provided a good heat sink is provided to the copper fin.

We shall now consider the numerical values for a particular structure, again assuming that $V_c/R=10^3$ volts/cm. We shall let $$R=5\times10^{-3}\ cm.=0.002\ \text{inch} \qquad (11.15)$$

Then, on a unit length basis, we have $V_g=0$, $V_c=5$ volts
$I_c=0.35$ ma./cm.
$g_m=300$ micromhos/cm.
$C_{\epsilon g}=C_{gc}=6\ \mu\mu$f./cm.
$\kappa$=transit time$=7\times10^{-9}$ sec.
$\Delta T=3\times10^{-3}$°K These figures correspond to very conservative operation of the device.

If the voltage is raised by a factor of 10, the non-linear range of mobility will be reached. However, the transit time will be reduced, the transconductance increased severalfold, and the current increased by more than a factor of 10. The temperature rise will still be negligible.

With the foregoing as background, we turn now to consideration of a number of specific embodiments of this invention. The translating device illustrated in Fig.

16 comprises a body 10, for example, of cross shape as shown, of semiconductive material such as germanium or silicon. At the corners defined by the meeting arms of the body are four regions or zones, two diagonally opposite zones, 11 and 12, being of N conductivity type and the other two, 13 and 14, being of P conductivity type. The bulk of the body, however, is of high resistivity and substantially intrinsic.

The P zone 14 is biased negative with respect to the P zone 13 as by a source 15 in series with a load represented generally by the resistor 16. The two N zones 11 and 12 are tied together directly and connected to the P zone 13 through an input impedance 17. A biasing source 18, poled as indicated in the drawing, may be provided between the N zones and the P zone 13.

The general principles involved in the operation of the device will be understood from the following consideration. Assume that the body 10 is of ideally intrinsic material with a wide energy gap so that the number of carriers, holes and electrons, therein is negligible. Assume further that the N zones are biased to equal positive potentials, and the P zones are biased to equal negative voltages. Then the potential distribution in the body in planes parallel to the plane of the drawing in Fig. 16 will be saddle shaped, of the general configuration depicted in Fig. 14. The potential is a minimum at the P zones 13 and 14 and a maximum at the N zones 11 and 12. Thus, there will be no tendency for any carriers of either sign to enter the intrinsic body, for positive carriers, holes, will be held in the P zones by virtue of the negative potential of these zones, and similarly, electrons are retained in the N zones by virtue of the positive potential of these zones. Also, if a carrier of either sign were generated or appeared in the intrinsic material, it would be withdrawn or swept out by virtue of the fields as depicted in Fig. 14, holes being attracted by the P zones and electrons by the N zones.

Consider now the conditions extant when the P zone 14 is strongly negative with respect to the P zone 13 and the N zones 11 and 12 are at the same or substantially the same potential as the P zone 13. The potential distributions in the intrinsic material, along several median planes extending from one to another of the zones, are of the forms portrayed in Figs. 17A, 17B, and 17C, respectively. When the zone 14 is made negative, as noted, a strong field is established in the intrinsic material such as to result in injection of carriers, specifically holes, into the intrinsic material, from the zone 13, and flow of these carriers to the zone 14. Thus, the former zone functions as a source and the latter as a drain.

The injection of holes at the source 13 and flow thereof to the drain 14 is controllable through the agency of the N zones 11 and 12 by several mechanisms employed individually or in combination. It is evident, particularly from Figs. 14 and 17A to 17C, that the negative field effecting the hole injection and flow will be reduced by the application of positive potentials to the N zones 11 and 12, the field suppression increasing with increasing positive potentials on the N zones. Also, the presence of holes in the intrinsic material results in a space charge tending to reduce and limit the injection of holes from the source. This space charge will be modified in accordance with variations in the potentials applied to the control zones 11 and 12.

Thus, the hole flow to the drain 14 and, hence, the current delivered to the load 16 is controllable in accordance with signals impressed across the input impedance 17.

The space charge noted may be controlled also by appropriately biasing the N zones so that one or both inject electrons into the intrinsic material, thereby controllably neutralizing the space charge with corresponding variations in the hole flow from the source.

In the discussion above, holes have been considered as the principal carriers. It will be apparent from similar analyses and from what has been said hereinbefore that the device may be operated in like manner utilizing electrons as the principal carriers. For this case, one of the N zones 11 and 12 is employed as the source, the other N zones as the drain, and the two P zones 13 and 14 as the control elements.

In the foregoing analysis, ideally intrinsic material was postulated. However, as has been discussed heretofore, materials containing very smal amounts of significant impurities can be employed to realize the results noted, the performance being essentially, for practical purposes, in complete accord with the analysis given. In such substantially intrinsic material, some formation of hole-electron pairs occurs for all practical temperatures. However, when voltages are applied to the several zones to produce potential distributions of the forms portrayed in Figs. 14 and 17, the generated carriers will be withdrawn or swept out so that for practical purposes, the bulk of the body 10 is free of thermally generated carriers. The carrier concentration, if any, is so small in comparison to the density of the injected carriers involved in the functioning of the device as to be negligible for practical purposes. Also, if the substantially intrinsic material contains an excess of donors or acceptors, when the carriers are swept out as mentioned above, a space charge effect will be produced whereby potentials will be established. However, such potentials will be small for bodies of small dimensions and may be neglected for practical purposes.

In the embodiment of this invention illustrated in Fig. 18, the semiconductor, e. g., germanium, body, for example of bar or thin strip form, includes a pair of zones 110 and 120 of N conductivity type on opposite faces of and contiguous with a zone or region 100 of substantially intrinsic material. Within and encompassed by the intrinsic material are zones 130 of P conductivity type arrayed to define a grid, these zones being connected together electrically, as by an external tie wire, not shown. As will appear presently, the N zone 110 functions as a source, the N zone 120 serves as the drain, and the P zones 130 constitute a control element.

The P zones 130 may be produced in one way by cutting bores, say of a few mils diameter, in the semiconductive body, introducing an acceptor, such as indium, or an alloy of the semiconductor and an acceptor, for example germanium-indium, into the bores, and then heating the assembly thereby to fuse the inserted material to the surrounding semiconductive body.

Both the N zones 110 and 120 are biased positive with respect to the P zone 130 as by batteries 19 and 20, the zone 120 further being positive with respect to the zone 110. A load, represented by the resistor 16, is connected between the source 110 and drain 120, and signals to be translated are impressed between the source 110 and control zones 130 as by way of an input transformer 21.

As the region 100 is of substantially intrinsic material, the carriers normally present therein are negligible in number and effect. Any carriers generated therein, as by thermal effects, are swept out, holes being attracted to the P zones 130 and electrons to the N zones 110 and 120. When the drain 120 is made strongly positive with respect to the source 110, electrons will be injected into the intrinsic region 100 and drawn to the drain. The field resulting in the electron flow from source to drain, and hence the drain, and load, currents, are amendable to control by the P zones 130, specifically in accordance with variations in the potential of the P zones in accordance with signals supplied to the transformer 21.

As in the case of the device of Fig. 16, in the device illustrated in Fig. 18, control of the drain current may be effected by two mechanisms. Variations in the potential of the control zones 130 will vary correspondingly the field acting to draw electrons from the source to the drain, and thus produce corresponding changes in the current supplied to the load 16. Also, if the control zones are appropriately biased, they may release holes into the intrinsic material thereby to neutralize the space charge due to the electrons injected at the emitter 110 with consequent alteration in the load current. This will occur automatically if the biases are adjusted so that the voltage on the grid is slightly positive in respect to the potential at which it would float at zero grid current. Either mechanism, or the two in combination, will effect control of the load current in accordance with the signals impressed upon the control zones by way of the input transformer 21.

Although in the embodiment of the invention illustrated in Fig. 18 the principal carriers involved are electrons, it will be appreciated that the invention may be practiced also by utilizing holes as the principal carriers. Thus, in a device of the construction illustrated in Fig. 18, the source and drain zones may be of P conductivity type and the control element of N conductivity type and the source polarities reversed from those indicated in the figure.

Design principles for the triode shown in Fig. 18 are similar to those illustrated for Fig. 16 modified for the different grid structure. Since a grid structure like that of Fig. 18 has a large number of paths between the control zones, higher transconductances will be obtained than for the structure of Fig. 16. A close spacing between grid wires compared to grid drain spacing will produce a high mu. Furthermore, as described in Section I hereinabove, the space charge may be neutralized in the source grid region by donors.

If we consider the case of substantially intrinsic material in the grid-source region, then the transconductance can be calculated in strict analogy with a vacuum tube simply by replacing Child's law by its analog. A preferred mode of operation will then be one in which the grid is negative in respect to the source or at least in respect to its immediate surroundings, and the drain is positive, as discussed in Section I.

An advantage over vacuum tube structure is that the electric field of electrons in the grid-drain region may be neutralized by a density of donors. This will prevent the field from building up with distance to undesirably high values which may produce unwanted generation of hole-electron pairs. This density of donors minus acceptors can be calculated from the desired direct current and electric field by the methods disclosed above. In Figs. 19A to 19D, there is illustrated the situation in such a structure: As shown in Fig. 19A, the source and drain are heavily doped N, denoted by $N_+$, the grid is $P_+$, the source grid space is substantially intrinsic, and the grid-drain space is slightly N-type, denoted by $N_-$. Fig. 19B shows the potential energy of the electrons. It shows a Child's law analog in the source-grid region and a transition to a stronger uniform field in the grid-drain region. This uniform field corresponds to zero net space charge, and this is accomplished by having a uniform density of donors throughout the region, as shown in Fig. 19D, which is just sufficient to compensate for the electron density produced by the desired current and field shown in Fig. 19C. Quite similar behavior would be obtained from the device if $N_d$ had the same value throughout the entire space region. It is understood that because of the possibility of compensation, the important density is $N_d-N_a$ rather than $N_d$ alone.

By controlling the donor and acceptor density in the grid-drain region, favorable transit time characteristics can be obtained so that the alternating current impedance looking into the drain will have a high positive or even a negative resistance component at certain frequencies.

In the embodiment of this invention illustrated in Fig. 20, the source and control zones 210 and 230, respectively, of N- and P-type, respectively, as shown, are of strip form and in parallel and alternate relation in one face of the substantially intrinsic body 200. The drain 220 is on the opposite face of the body and may be in the form of a layer coextensive with this face. The source and drain are biased positive by sources 19 and 20, the drain bias being substantially greater than that upon the source whereby electrons injected into the intrinsic material 200 from the source are drawn to the drain. The flow of these electrons is controlled in accordance with signals applied to the control zones 230, which are biased negative, as shown. The control is effected by one or more of the mechanisms discussed hereinabove in connection with Figs. 16 and 18.

It will be appreciated, of course, that in the embodiment of the invention illustrated in Fig. 20, holes, instead of electrons, may be utilized to produce the output current. For this case, the drain 220 would be made of P-type and biased highly negative, the P-zones 230 would be operated as the source and the N zones 210 as the control element.

The invention may be embodied also in translating devices including two or more auxiliary or control zones or grids between the source and drain regions. For example, in one embodiment illustrated in Fig. 21A, the semiconductive, e. g., germanium, body has an intermediate portion 100 of substantially intrinsic conductivity, say of very weak N-type as indicated, and strongly N-type source and drain end portions 110 and 120, respectively. Interposed between the source and drain regions are a pair of electrodes or grids 130 and 25 each of which is composed of a group of P zones, the two groups being in parallel array and parallel also to the source and drain regions. Advantageously, the zones of the two groups are mutually aligned, as shown in the drawing.

The source 110, drain 120, and grid 130 may be biased relatively in the same manner as in the device illustrated in Fig. 18, and the grid 130 utilized as a control electrode. The electrode 25 may be utilized as a screen grid to reduce the capacitance between the drain and the control grid 130, in a manner analogous to a screen grid in tetrode electron discharge devices. It is to be noted that if used as a screen grid, the electrode 25 may be operated at substantially zero current even if biased positive relative to the source. The grid 25 may be utilized also as a second control electrode whereby modulation or mixing of signals may be effected.

The potential distribution in the semiconductor body of the device illustrated in Fig. 21A is portrayed in Fig. 21B. The double valued portions at $x$ and $y$ of the curve correspond to lines between the zones of the electrodes 130 and 25 and through these zones. Thus, it will be noted that these zones are slightly negative with respect to the immediately adjacent portions of the body 100.

In the embodiment of this invention illustrated in Fig. 22, the semiconductive, e. g., germanium, body 200 is of substantially intrinsic material and has therein an N source zone 210 and two N drain zones 220A and 220B positioned on opposite sides of and spaced equally from a P barrier zone 26. The latter is directly opposite and aligned with the source zone 210. On opposite sides of the axis of alignment of the source 210 and barrier 26 and equally spaced therefrom are a pair of P control zones 230A and 230B.

As shown in Fig. 22, the barrier zone 26 is tied directly to the source, and the drains 220A and 220B are each biased positive with respect to the source by the source 20. Individual loads, represented by the resistors 16A and 16B, are connected to the drains, and signal sources 27A and 27B are connected each between the source and a respective control electrode or zone 230A and 230B.

In operation of the device depicted in Fig. 22, electrons from the source 210 are injected into the substantially intrinsic body 200 and, because of the relative potential due to the barrier 26, the electron stream is divided, and current is supplied to both loads 16A and 16B. The magnitude of the current to either load is controllable by varying the potential of the control zones 230A and 230B.

For example, if the zone 230A is made negative, the current to the collector 220A may be reduced or cut off. Thus, the device may be utilized, for example, as a control element, as a push-pull amplifier, or a push-pull mixer.

In the embodiment of this invention illustrated in Fig. 23, the substantially intrinsic body 200 has associated therewith an N source zone 210, two N drain zones 220A and 220B, and a P auxiliary zone 26. The auxiliary zone and the drains are biased positive with respect to the source by direct current sources 190 and 20, respectively, a load 16 being associated with the drains as shown.

In operation of the device illustrated in Fig. 23, electrons flow from the source 210 to the drains 220A and 220B. The auxiliary zone 260 is biased slightly negative with respect to the immediately adjacent portions of the body 200 so that it retains holes and repels electrons. When a signal is applied to the zone 260 by the source 27 so that this zone becomes positive, it will collect electrons and emit holes. The latter flow principally to the drains 220A and 220B and thereby increase the current to the load. Thus, current gain is obtained.

A modification of the device illustrated in Fig. 23 is shown in Fig. 24 and comprises a grid 28 composed of a series of N zones, opposite the auxiliary electrode or zone 260. The zone 260 injects holes into the body 200, and these flow to the source 210 thereby to increase the electron injection thereby. The magnitude of the hole current is controlled by the signal source 27 whereby the current supplied to the load 16 is varied accordingly. Although in Fig. 24 the input signal is indicated as applied to the zone 260, it may be applied alternatively to the electrode or grid 28. Also, the output may be taken from the drains 220 and 220B instead of from the source as shown.

In the embodiment of the invention illustrated in Fig. 25, which will be recognized as a modification of that illustrated in Fig. 18, the P-type control zone 130A is in a form of a band extending around the substantially intrinsic zone 100 and contiguous therewith. The control zone, it will be noted, intercepts all lines along the surface of the intrinsic zone 100 between the source and drain regions 110 and 120, respectively. Thus, surface leakage currents are reduced and substantially all carriers flowing between the zones 110 and 120 are subject to control in accordance to signals applied to the control zone 130A.

Fig. 26 depicts a modification of the embodiment of the invention illustrated in Fig. 25, wherein the control zone includes in addition to the band part 130A a multiplicity of intersecting rod or wire-like elements 40 defining a mesh of P-type material electrically integral with the band portion 130A.

The invention may be embodied also in translating devices wherein the several zones, that is, the source, drain, and control zones, are of circular cylindrical configuration and disposed in coaxial relation. One such device is illustrated in Fig. 27 and comprises coaxial source, substantially intrinsic and drain zones 110A, 100A, and 120A, respectively. The control element or zone of P-type material is composed of parallel rods 40A disposed in a cylindrical boundary about and coaxial with the source zone 110A. The rod portions may be connected at one or both ends by annular P-type zones 41.

In some applications, the Child's law analog current obtainable may be larger than desired so that deleterious heating results. A lower current density source which will avoid these possible objections may be obtained by fabricating the semiconductor in the manner illustrated in Fig. 28. Specifically, as is illustrated, there is provided a weakly P-type zone 42 immediately adjacent the source zone 110 and contiguous therewith and the substantially intrinsic region 100. This construction provides a small increased rise in potential because of the space charge of the acceptors associated with the P zone 42. However, this still permits control of current flow by the grid or control electrode 130 but at a lower current density level than in the case where the substantially intrinsic region extends between two highly doped N zones.

The invention may be embodied also in analogs of remote cut-off or volume control discharge devices. Two illustrative embodiments are portrayed in Figs. 29 and 30. In the former, the control zone or grid 130 is composed of a series of elements, the spacing between adjacent ones of which varies in prescribed manner along the structure. In the device illustrated in Fig. 30, the elements of the grid or control zone 130 are uniformly spaced from one another, but the source to grid spacing varies in a prescribed manner.

In general, in the several embodiments of the invention shown and described, it will be understood that N and P zones may be interchanged, accompanied, of course, by appropriate changes in the polarities of the biases. Further, it will be appreciated that although the invention has been disclosed with particular reference to amplifiers, it may be embodied also in oscillators, modulators, and other types of signaling devices. In general, the invention provides semiconductor analogs for electron discharge devices, which may be utilized in known vacuum tube circuits with little, if any, change in circuit configuration. It will be understood also that the embodiments disclosed are but illustrative and that various modifications may be made therein without departing from the scope and spirit of this invention.

What is claimed is:

1. A signal translating device comprising a semiconductive body including a space body region of relatively high specific resistivity, first and second zones of relatively low specific resistivity and of one conductivity type spaced from one another by said body region for defining therebetween a path of flow for carriers of the sign predominant in said zones, and third and fourth zones of relatively low specific resistivity and of the conductivity type opposite that of said first and second zones positioned along said path of flow, an input circuit connected between said first and third and fourth zones including means for biasing each of said third and fourth zones relative to said space body region for minimizing the introduction into the space body region of carriers of the sign predominant in the third and fourth zones and for sweeping out of the space body region carriers of such sign, and an output circuit connected between said first and second zones including means for biasing said first zone relative to said second zone for forming a space-charge region of the space body region therebetween and producing a space-charge-limited flow of carriers of the sign predominant in said first zone from said first zone to said second zone.

2. A signal translating device according to claim 1 characterized in that the donor-acceptor unbalance in said space body region is less than five percent the number of thermally generated carriers at the operating temperature in ideally intrinsic semiconductive material of the kind forming the semiconductive body.

3. A signal translating device comprising a semiconductive body including a space body region of relatively high specific resistivity, source and drain zones of relatively low specific resistivity and of one conductivity type spaced apart from one another by said space body region for defining from said source to said drain a path of flow for carriers of the type predominant in said source and drain zones, and a plurality of control zones of relatively low specific resistivity and of the conductivity type opposite that of said source and drain zones positioned along said path of charge flow, an input circuit connected between said source and control zones including means for biasing said control zones relative to said spaced body region for minimizing the introduction into the space body region of carriers of the type predominant in the control source and sweeping out of the space body region carriers of such type, and an output circuit connected between said source and drain zones including means for biasing said source relative to said drain for forming a space-charge region of the space body region therebetween and giving rise to a space-charge-limited flow from the source to the drain zones of carriers of the type predominant in said source and drain zones.

4. A signal translating device according to claim 3 further characterized in that the source and drain zones are opposite surface portions of the semiconductive body and the control zones are positioned in the space body region intermediate such surface portions.

5. A signal translating device according to claim 3 further characterized in that the space body region intermediate between the source and drain zones comprises a first portion adjacent the source zone of lower specific resistivity than a second portion adjacent the drain zone.

6. A signal translating device according to claim 3 further characterized in that the body includes a plurality of discrete source zones.

7. A signal translating device according to claim 3 further characterized in that the semiconductive body includes a plurality of discrete drain zones.

References Cited in the file of this patent

UNITED STATES PATENTS

| | | |
|---|---|---|
| 2,502,479 | Pearson et al. | Apr. 4, 1950 |
| 2,524,035 | Bardeen et al. | Oct. 3, 1950 |
| 2,561,411 | Pfann | July 24, 1951 |
| 2,569,347 | Shockley | Sept. 25, 1951 |
| 2,570,978 | Pfann | Oct. 9, 1951 |
| 2,586,080 | Pfann | Feb. 19, 1952 |
| 2,600,500 | Haynes et al. | June 17, 1952 |
| 2,623,105 | Shockley et al. | Dec. 23, 1952 |

OTHER REFERENCES

"Electrons and Holes in Semiconductors," Shockley, pp. 24–26, published 1950 by D. Van Nostrand Co., N. Y.